(12) United States Patent
Nojima

(10) Patent No.: US 11,022,871 B2
(45) Date of Patent: Jun. 1, 2021

(54) WAVELENGTH CONVERSION ELEMENT, ILLUMINATOR, AND PROJECTOR

(71) Applicant: SEIKO EPSON CORPORATION, Tokyo (JP)

(72) Inventor: Shigeo Nojima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/774,297

(22) Filed: Jan. 28, 2020

(65) Prior Publication Data
US 2020/0241406 A1 Jul. 30, 2020

(30) Foreign Application Priority Data
Jan. 29, 2019 (JP) .............................. JP2019-013260

(51) Int. Cl.
*G03B 21/20* (2006.01)
*G03B 21/14* (2006.01)
*H04N 9/31* (2006.01)

(52) U.S. Cl.
CPC ......... *G03B 21/204* (2013.01); *G03B 21/145* (2013.01); *G03B 21/2066* (2013.01); *H04N 9/3161* (2013.01); *H04N 9/3164* (2013.01)

(58) Field of Classification Search
CPC ............ G03B 21/00–64; G02B 26/008; H04N 9/31–3197
See application file for complete search history.

(56) References Cited

U.S. PATENT DOCUMENTS

| 2011/0310363 | A1* | 12/2011 | Kita | ........................ F21V 13/14 |
| | | | | 353/98 |
| 2016/0238922 | A1* | 8/2016 | Furuyama | ............ G03B 21/204 |
| 2016/0363294 | A1* | 12/2016 | Yu | ......................... F21S 41/176 |
| 2018/0031958 | A1 | 2/2018 | Ikeda et al. | |
| 2019/0072243 | A1 | 3/2019 | Egawa | |

FOREIGN PATENT DOCUMENTS

| JP | 2017-083581 A | 5/2017 |
| JP | 2018-025750 A | 2/2018 |

* cited by examiner

*Primary Examiner* — Michelle M Iacoletti
*Assistant Examiner* — Christopher A Lamb, II
(74) *Attorney, Agent, or Firm* — Oliff PLC

(57) ABSTRACT

A wavelength conversion element according to an aspect of the present disclosure includes a substrate having a reflection surface, a wavelength converter that has a first surface on which excitation light that belongs to a first wavelength band is incident, a second surface located at a side opposite the first surface, and a third surface that intersects the first or second surface and converts the excitation light in terms of wavelength into fluorescence that belongs to a second wavelength band different from the first wavelength band, a holder that is so provided as to face the first or third surface and holds the wavelength converter in the direction along the direction in which the excitation light is incident and in a direction that intersects the light incident direction, and a fixer that fixes the holder.

5 Claims, 18 Drawing Sheets

WAVELENGTH CONVERSION ELEMENT, ILLUMINATOR, AND PROJECTOR

The present application is based on, and claims priority from JP Application Serial Number 2019-013260, filed Jan. 29, 2019, the disclosure of which is hereby incorporated by reference herein in its entirety.

BACKGROUND

1. Technical Field

The present disclosure relates to a wavelength conversion element, an illuminator, and a projector.

2. Related Art

In recent years, as an illuminator for a projector, there is a proposed illuminator using a wavelength conversion element, such as a rotational fluorescent plate. The rotational fluorescent plate produces fluorescence when a phosphor layer provided in a substrate is irradiated with excitation light in a state in which the substrate is rotated. The illuminator thus outputs illumination light containing the fluorescence.

JP-A-2018-25750 discloses a "wavelength conversion element" including a substrate, a reflection enhancing film layer, a ring-shaped phosphor layer, and an adhesive layer. In the wavelength conversion element, the reflection enhancing film layer is provided on one surface of the substrate, and the phosphor layer is glued to the reflection enhancing film layer via the adhesive layer.

The temperature of the wavelength conversion element increases when the wavelength conversion element is irradiated with excitation light. Therefore, when the phosphor layer is fixed to the substrate via the adhesive layer, as in the wavelength conversion element disclosed in JP-A-2018-25750, the difference in coefficient of linear expansion between the phosphor layer and the substrate could result in breakage of the phosphor layer. The reliability of the wavelength conversion element could therefore decrease.

SUMMARY

A wavelength conversion element according to an aspect of the present disclosure includes a substrate having a reflection surface, a wavelength converter that has a first surface on which excitation light that belongs to a first wavelength band is incident, a second surface located at a side opposite the first surface, and a third surface that intersects the first or second surface and converts the excitation light in terms of wavelength into fluorescence that belongs to a second wavelength band different from the first wavelength band, a holder that is so provided as to face the first or third surface and holds the wavelength converter in a direction along a direction in which the excitation light is incident and in a direction that intersects the light incident direction, and a fixer that fixes the holder.

In the wavelength conversion element according to the aspect of the present disclosure, the holder may include a first holder that presses the wavelength converter against the substrate in the direction along the light incident direction and a second holder that restricts movement of the wavelength converter in the direction that intersects the light incident direction.

In the wavelength conversion element according to the aspect of the present disclosure, the wavelength converter may have an annular shape having a circular opening when viewed in the direction along the light incident direction, the holder may include an elastically deformable member, the member may have a portion that overlaps with the opening when viewed in the direction along the light incident direction and another portion that overlaps with an inner edge portion of the wavelength converter when viewed in the direction along the light incident direction, and the member may be fixed by the fixer in the portion that overlaps with the opening and press the inner edge portion of the wavelength converter.

In the wavelength conversion element according to the aspect of the present disclosure, the wavelength converter may have an annular shape having a circular opening when viewed in the direction along the light incident direction, the holder may include an elastically deformable member, the member may have a portion that overlaps with an area of the substrate that is an area outside the wavelength converter when viewed in the direction along the light incident direction and another portion that overlaps with an outer edge portion of the wavelength converter when viewed in the direction along the light incident direction, and the member is fixed by the fixer in a portion outside the wavelength converter and presses the outer edge portion of the wavelength converter.

An illuminator according to another aspect of the present disclosure includes the wavelength conversion element according to the aspect of the present disclosure and a light source that outputs the excitation light toward the wavelength conversion element.

In the illuminator according to the aspect of the present disclosure, the wavelength conversion element may be rotatable around a rotational shaft, and the illuminator may further include a rotator that rotates the wavelength conversion element around the rotational shaft.

A projector according to another aspect of the present disclosure includes the illuminator according to the aspect of the present disclosure, a light modulator that modulates light from the illuminator in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 4.

In the following drawings, components are drawn at different dimensional scales in some cases for clarity of each of the components.

An example of a projector according to the present embodiment will be described.

A projector according to the present embodiment is a projection-type image display apparatus that displays color video images on a screen (projection receiving surface). The projector includes three light modulators corresponding to red light, green light, and blue light. The projector includes a semiconductor laser, which produces high-luminance, high-power light, as the light source of an illuminator.

Figure 1:
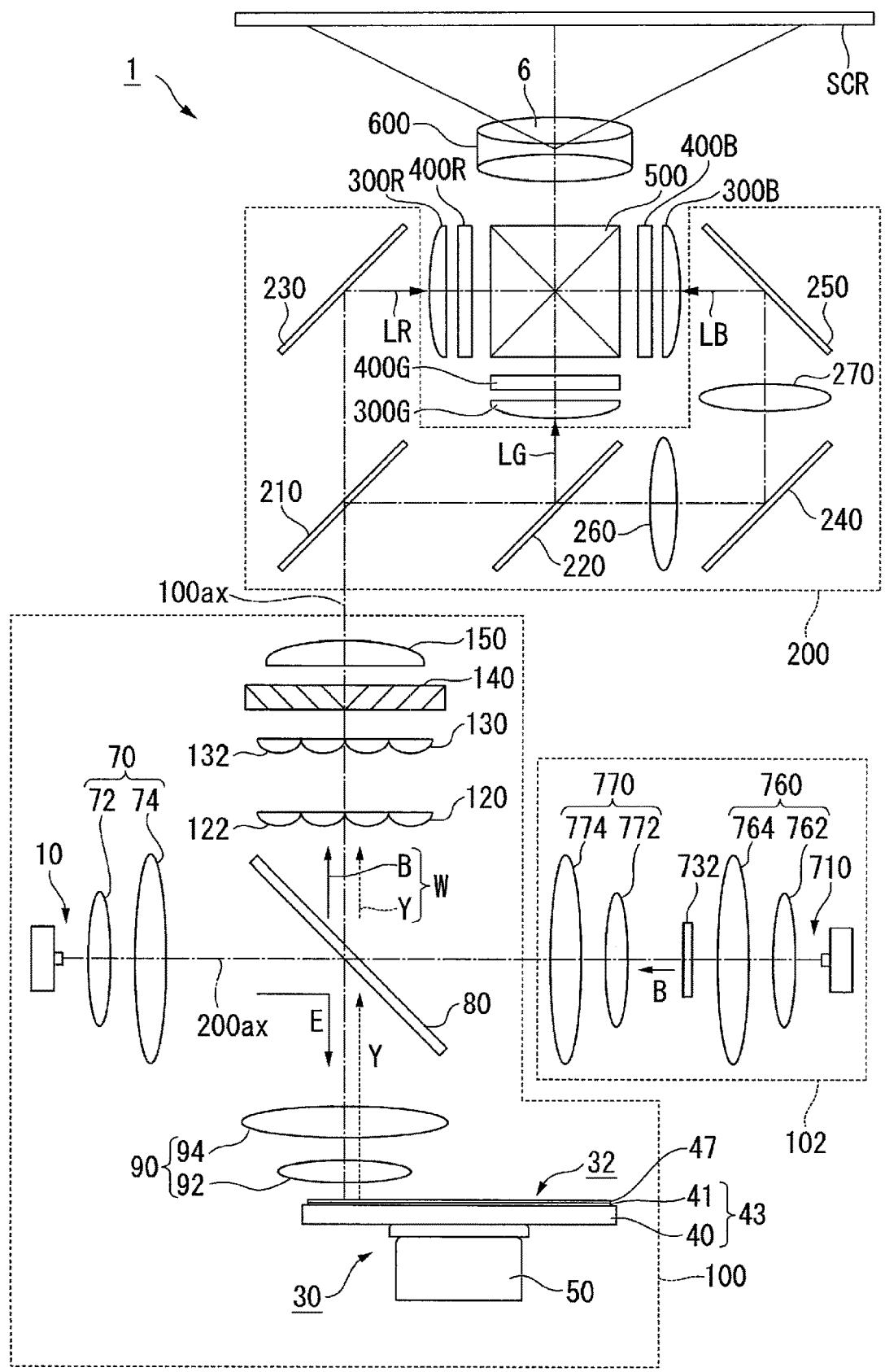
FIG. 1 is a schematic configuration diagram of a projector according to a first embodiment.

FIG. 1 is a schematic view showing the optical system of a projector 1 according to the present embodiment.

The projector 1 according to the present embodiment includes a first illuminator 100, a second illuminator 102, a color separation/light guide system 200, a light modulator 400R, a light modulator 400G, a light modulator 400B, a light combining element 500, and a projection optical apparatus 600, as shown in FIG. 1.

The first illuminator 100 according to the present embodiment corresponds to the illuminator in the appended claims.

The first illuminator 100 includes a first light source 10, a collimation system 70, a dichroic mirror 80, a collimation/light collection system 90, a wavelength conversion apparatus 30, a first lens array 120, a second lens array 130, a polarization conversion element 140, and a superimposing system 150.

The first light source 10 is formed of a semiconductor laser that outputs blue excitation light E that belongs to a first wavelength band. The excitation light E has a wavelength ranging, for example, from 440 to 450 nm, and the wavelength at which the intensity of the emitted light peaks is, for example, 445 nm. The first light source 10 may be formed of one semiconductor laser or a plurality of semiconductor lasers. The first light source 10 is so disposed that an optical axis 200ax of the laser beam outputted from the first light source 10 is perpendicular to an illumination optical axis 100ax. The first light source 10 may instead be a semiconductor laser that outputs excitation light having a peak wavelength other than 445 nm, for example, a peak wavelength of 460 nm. The first light source 10 outputs the excitation light E toward a wavelength conversion element 32.

The first light source 10 in the present embodiment corresponds to the light source in the appended claims.

The collimation system 70 includes a first lens 72 and a second lens 74. The collimation system 70 substantially parallelizes the light outputted from the first light source 10. The first lens 72 and the second lens 74 are each formed of a convex lens.

The dichroic mirror 80 is so disposed in the optical path from the collimation system 70 to the collimation/light collection system 90 as to intersect at 45° the optical axis 200ax of the first light source 10 and an illumination optical axis 100ax. The dichroic mirror 80 reflects the excitation light E formed of a blue light component and transmits yellow fluorescence Y containing a red light component and a green light component.

The collimation/light collection system 90 has the function of collecting the excitation light E having passed through the dichroic mirror 80 and causing the collected excitation light E to be incident on a wavelength converter 47 of the wavelength conversion apparatus 30 and the function of substantially parallelizing the fluorescence Y outputted from the wavelength conversion apparatus 30. The collimation/light collection system 90 includes a first lens 92 and a second lens 94. The first lens 92 and the second lens 94 are each formed of a convex lens.

The second illuminator 102 includes a second light source 710, a light collection system 760, a diffuser 732, and a collimation system 770.

The second light source 710 is formed of a semiconductor laser that outputs light that belongs to the same wavelength band as the wavelength band to which the light outputted from the first light source 10 of the first illuminator 100 belongs. The second light source 710 may be formed of one semiconductor laser or a plurality of semiconductor lasers. The second light source 710 may instead be formed of a semiconductor laser that outputs light that belongs to a wavelength band different from the wavelength band to which the light outputted from the first light source 10 belongs.

The light collection system 760 includes a first lens 762 and a second lens 764. The light collection system 760 collects blue light B outputted from the second light source 710 on a diffusion surface of the diffuser 732 or on a plane in the vicinity of the diffuser 732. The first lens 762 and the second lens 764 are each formed of a convex lens.

The diffuser 732 diffuses the blue light B outputted from the second light source 710 to produce blue light B having a light orientation distribution close to the light orientation distribution of the fluorescence Y outputted from the wavelength conversion apparatus 30. The diffuser 732 can be made, for example, of ground glass made of optical glass.

The collimation system 770 includes a first lens 772 and a second lens 774. The collimation system 770 substantially parallelizes the light having exited out of the diffuser 732. The first lens 772 and the second lens 774 are each formed of a convex lens.

The blue light B outputted from the second illuminator 102 is reflected off the dichroic mirror 80 and combined with the fluorescence Y having been outputted from the wavelength conversion apparatus 30 and having passed through the dichroic mirror 80 to produce white light W. The white light W enters the first lens array 120. The configuration of the wavelength conversion apparatus 30 will be described later in detail.

The first lens array 120 includes a plurality of first lenses 122 for dividing the light having exited via the dichroic mirror 80 into a plurality of sub-light fluxes. The plurality of first lenses 122 are arranged in a matrix in a plane perpendicular to the illumination optical axis 100ax.

The second lens array 130 includes a plurality of second lenses 132 corresponding to the plurality of first lenses 122 of the first lens array 120. The second lens array 130 cooperates with the superimposing lens 150 on the downstream of the second lens array 130 to form images of the first lenses 122, which form the first lens array 120, in the vicinity of an image formation area of each of the light modulators 400R, 400G, and 400B. The plurality of second lenses 132 are arranged in a matrix in a plane perpendicular to the illumination optical axis 100ax.

The polarization conversion element 140 converts the plurality of divided sub-light fluxes from the first lens array 120 into linearly polarized light fluxes having an aligned polarization direction.

The superimposing lens 150 collects the sub-light fluxes having exited out of the polarization conversion element 140 and superimposes the collected sub-light fluxes on one another in the vicinity of the image formation area of each of the light modulators 400R, 400G, and 400B. The first lens array 120, the second lens array 130, and the superimposing lens 150 form an optical integration system that homogenizes in an irradiation receiving plane the optical intensity distribution of the light outputted from the wavelength conversion apparatus 30.

The color separation/light guide system 200 includes a dichroic mirror 210, a dichroic mirror 220, a reflection mirror 230, a reflection mirror 240, a reflection mirror 250, a relay lens 260, and a relay lens 270. The color separation/light guide system 200 separates the white light W produced by the first illuminator 100 and the second illuminator 102 into red light LR, green light LG, and blue light LB and guides the red light LR, the green light LG, and the blue light LB to the corresponding light modulators 400R, 400G, and 400B.

A field lens 300R is disposed between the color separation/light guide system 200 and the light modulator 400R. A field lens 300G is disposed between the color separation/light guide system 200 and the light modulator 400G. A field lens 300B is disposed between the color separation/light guide system 200 and the light modulator 400B.

The dichroic mirror 210 transmits the red light component and reflects the green light component and the blue light component. The dichroic mirror 220 reflects the green light component and transmits the blue light component. The reflection mirror 230 reflects the red light component. The reflection mirrors 240 and 250 reflect the blue light component.

The red light LR having passed through the dichroic mirror 210 is reflected off the reflection mirror 230, passes through the field lens 300R, and is incident on the image formation area of the light modulator 400R for red light. The green light LG reflected off the dichroic mirror 210 is further reflected off the dichroic mirror 220, passes through the field lens 300G, and is incident on the image formation area of the light modulator 400G for green light. The blue light LB having passed through the dichroic mirror 220 travels via the relay lens 260, the light-incident-side reflection mirror 240, the relay lens 270, the light-exiting-side reflection mirror 250, and the field lens 300B and is incident on the image formation area of the light modulator 400B for blue light.

The light modulators 400R, 400G, and 400B each modulate the color light incident thereon in accordance with image information to form image light. The light modulators 400R, 400G, and 400B are each formed of a liquid crystal light valve. Although not shown, a light-incident-side polarizer is disposed on the light incident side of each of the light modulators 400R, 400G, and 400B. A light-exiting-side polarizer is disposed on the light exiting side of each of the light modulators 400R, 400G, and 400B.

The light combining element 500 combines the image light outputted from the light modulator 400R, the image light outputted from the light modulator 400G, and the image light outputted from the light modulator 400B with one another to form full-color image light. The light combining element 500 is formed of a cross dichroic prism formed of four right-angled prisms bonded to each other and having a substantially square shape in a plan view. Dielectric multilayer films are formed on the substantially X-letter-shaped interfaces along which the right-angled prisms are bonded to each other.

The image light having exited out of the light combining element 500 is enlarged and projected by the projection optical apparatus 600 to form an image on the screen SCR. That is, the projection optical apparatus 600 projects the light modulated by the light modulators 400R, 400G, and 400B. The projection optical apparatus 600 is formed of a plurality of projection lenses 6.

The wavelength conversion apparatus 30 will be described below.

Figure 2:
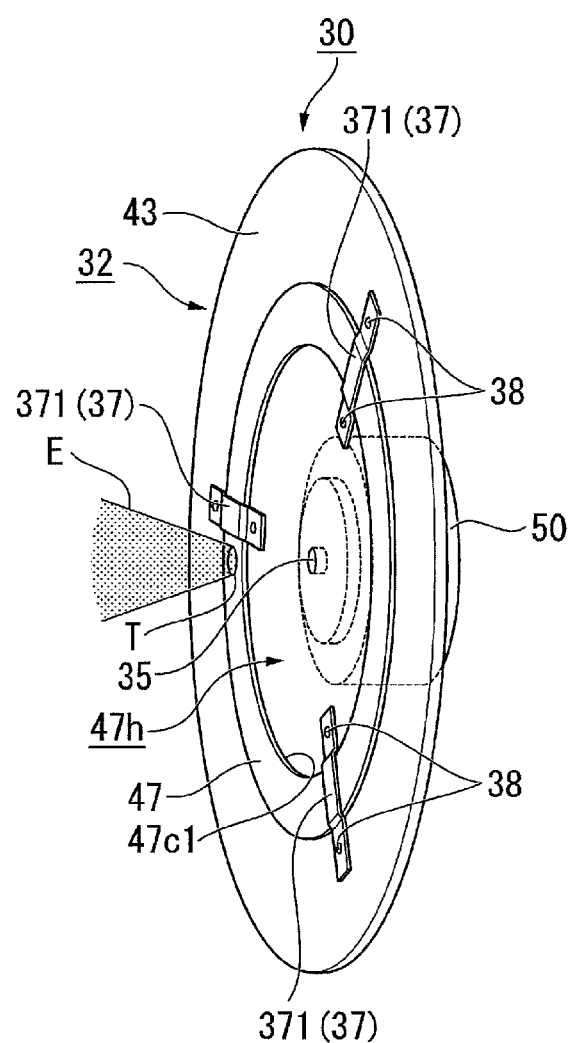
FIG. 2 is a perspective view of a wavelength conversion apparatus in the first embodiment.
Figure 3:
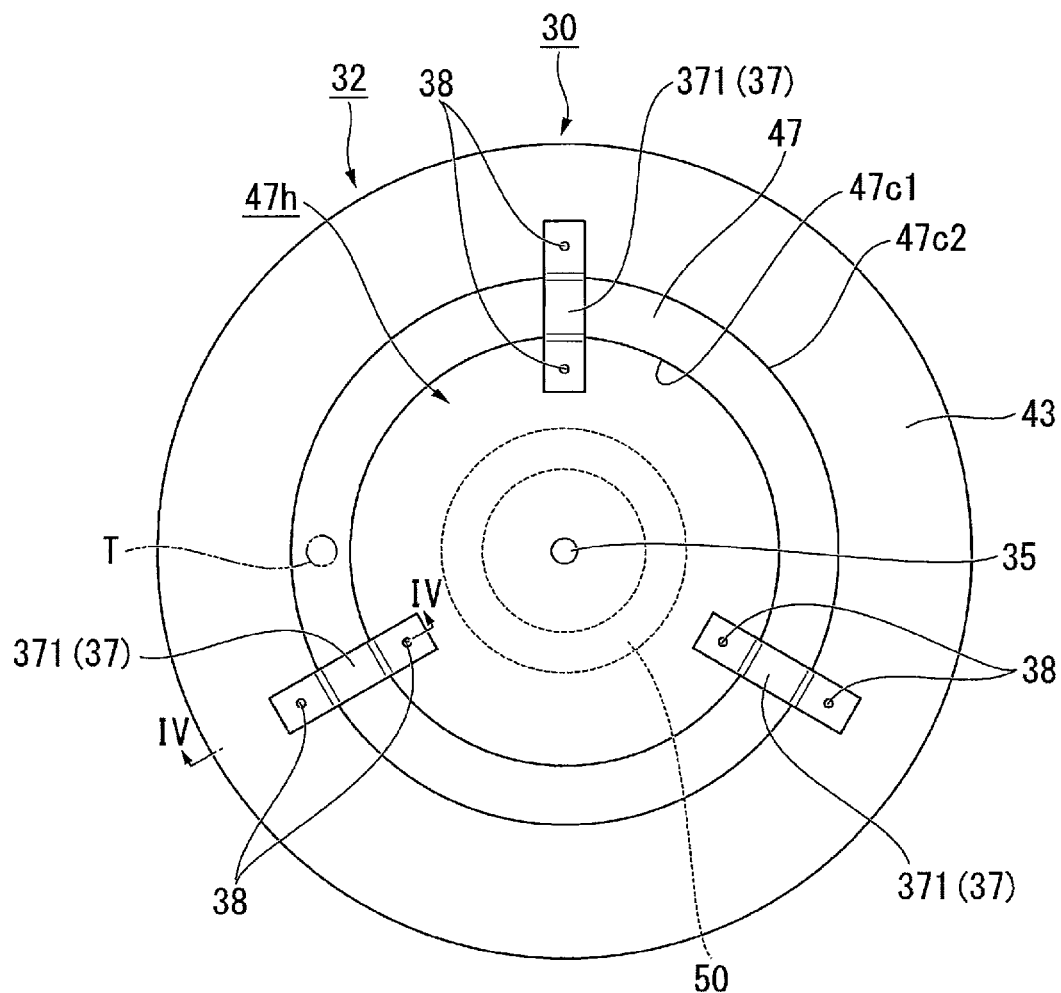
FIG. 3 is a front view of the wavelength conversion apparatus.
Figure 4:
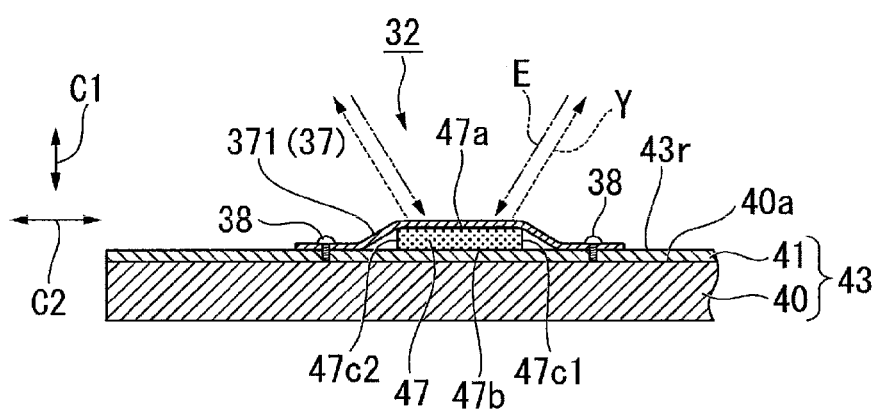
FIG. 4 is a cross-sectional view of the wavelength conversion apparatus taken along the line IV-IV in FIGS. 3, 6, and 7.

FIG. 2 is a perspective view showing the wavelength conversion apparatus 30. FIG. 3 is a front view of the wavelength conversion apparatus 30. FIG. 4 is a cross-sectional view of the wavelength conversion element 32 taken along the line IV-IV in FIG. 3.

The wavelength conversion apparatus 30 in the present embodiment includes the wavelength conversion element 32 and a motor 50 (rotator), as shown in FIGS. 2 and 3.

The wavelength conversion element 32 is rotatable around a rotational shaft 35. The motor 50 rotates the wavelength conversion element 32 around the rotational shaft 35. The excitation light E outputted from the first light source 10 is therefore incident on the rotating wavelength conversion element 32.

The wavelength conversion element 32 according to the present embodiment includes a substrate 43, the wavelength converter 47, a holder 37, and fixers 38, as shown in FIG. 4. The wavelength conversion element 32 outputs the fluorescence Y toward the same side as the side on which the excitation light E is incident. That is, the wavelength conversion element 32 is a reflective wavelength conversion element.

The substrate 43 includes a substrate body 40 and a reflection layer 41. The substrate body 40 is made of a metal-containing material. As an example, the substrate body 40 is formed of a circular plate made of a metal having high thermal conductivity, such as aluminum and copper.

A reflection layer 41 is provided on an entire first surface 40a of the substrate body 40. The reflection layer 41 reflects the fluorescence Y and the excitation light E having exited via a second surface 47b of the wavelength converter 47. The reflection layer 41 is, made, for example, of a metal having high reflectance, such as silver. The reflection layer 41 is so designed as to reflect the fluorescence Y and the excitation light E at high reflectance. To form a smooth reflection layer 41, the first surface 40a of the substrate body 40 has a high degree of smoothness. The reflection layer 41 thus reflects most of the fluorescence Y upward in FIG. 4 (toward side opposite substrate body 40). That is, the substrate 43 has a reflection surface 43r, which reflects the fluorescence Y.

A protection film that is not shown may be provided on a side of the reflection layer 41 that is the side on which the excitation light E is incident. The protection film is formed of a light transmissive film made, for example, of $Si_2$ or $Al_2O_3$. When the protection film is provided, the reflection layer 41 is protected from the external atmosphere and can reflect the fluorescence Y incident at a variety of angles on the surface of the substrate 43 at high reflectance. Further, a protection film that is not shown but is intended to protect the reflection layer 41 from degradation may further be provided between the reflection layer 41 and the first surface 40a of the substrate body 40.

The wavelength converter 47 has an annular shape having a circular opening 47h around the rotational shaft 35 of the substrate 43, as shown in FIGS. 2 and 3. That is, the wavelength converter 47 is so provided on the side facing the reflection surface 43r of the substrate 43 as to surround the rotational shaft 35. The wavelength converter 47 is formed of a wavelength conversion layer having a predetermined thickness.

The wavelength converter 47 has a first surface 47a, on which the excitation light E, which belongs to the first wavelength band, is incident, a second surface 47b, which is located at the side opposite the first surface 47a, and third surfaces 47c1 and 47c2, which intersect the first surface 47a or the second surface 47b, as shown in FIG. 4.

The wavelength converter 47 contains a ceramic phosphor that converts in terms of wavelength the excitation light E into the fluorescence Y, which belongs to a wavelength band different from the wavelength band to which the excitation light E belongs. That is, the wavelength converter 47 converts the excitation light E, which belongs to the first wavelength band, into the fluorescence Y, which belongs to a second wavelength band different from the first wavelength band. The second wavelength band ranges, for example, from 490 to 750 nm, and the fluorescence Y is yellow light containing the red light component and the green light component. The wavelength converter 47 may contain a single crystal phosphor.

The surface roughness Ra of the second surface 47b of the wavelength converter 47 is desirably about 1.0. The wavelength converter 47 includes a large number of pores for scattering light, and part of the pores are exposed via the surface of the wavelength converter 47 in some cases. In such cases, when the wavelength converter 47 is manufactured, desired surface roughness can be achieved by selecting as appropriate whether or not the second surface 47b is polished or the degree of polishing.

The wavelength converter 47 contains, for example, an yttrium-aluminum-garnet-based (YAG-based) phosphor. Consider YAG:Ce, which contains cerium (Ce) as an activator, byway of example, and the wavelength converter 47 can be made, for example, of a material produced by mixing raw material powder containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

When the excitation light E enters the wavelength converter 47, heat is generated in the wavelength converter 47. In the present embodiment, the motor 50 rotates the wavelength conversion element 32 to change the position where the excitation light E is incident on the wavelength converter 47 over time. The change in the excitation light incident position prevents degradation of the wavelength converter 47 that occurs when the excitation light E keeps impinging on the same position on the wavelength converter 47 so that only part of the wavelength converter 47 is locally heated. In FIG. 3, light incident area T represents the area on which the excitation light E is incident.

The holder 37 includes a plurality of first holders 371, as shown in FIGS. 2 and 3. The holder 37 is so provided as to face the first surface 47a or the third surfaces 47c1 and 47c2 of the wavelength converter 47 and holds the wavelength converter 47 in a direction C1, in which the excitation light E is incident, and in a direction C2, which intersects the light incident direction, as shown in FIG. 4. In the present specification, the direction in which the excitation light E is incident is defined as the direction of a normal to the reflection surface 43r of the substrate 43.

The plurality of first holders 371 are disposed with a gap therebetween in the circumferential direction of the wavelength converter 47. The number of first holders 371 or the arrangement thereof is not limited to a specific number or a specific arrangement, and three or more first holders 371 are desirably provided at substantially equal intervals.

The first holders 371 press the wavelength converter 47 against the substrate 43 in a direction that intersects the first surface 40a of the substrate body 40, in other words, in the direction C1, in which the excitation light E is incident. The first holders 371 are each formed, for example, of a belt-shaped, elastically deformable plate spring member made of stainless steel. The first holders 371 are so provided as to extend over the wavelength converter 47 in the radial direction of the substrate 43.

The opposite ends of each of the first holders 371 are fixed by the fixers 38 to the substrate 43. The fixers 38 are each formed of a fixing member, for example, a pin or a bolt. The first holders 371 themselves are elastically deformed and curved, and the curved first holders 371 and the substrate 43 sandwich the wavelength converter 47. The first holders 371 thus press the wavelength converter 47 against the substrate 43 at appropriate pressure. The fixers 38 thus fix the first holders 317 to the substrate 43.

The first holders 371 are each formed of a member that physically fixes the wavelength converter 47 by pressing the wavelength converter 47, sandwiching the wavelength converter 47, or otherwise fixing the wavelength converter 47. The first holders 371 therefore include no glueing material, adhesive material, or material that directly joins the wavelength converter 47 to the substrate 43 as a material that holds the wavelength converter 47.

In the present embodiment, the wavelength converter 47 is pressed by the first holders 371 against the substrate 43 and is in direct contact with the substrate 43. The wavelength converter 47 and the substrate 43, however, each have minute irregularities, warpage, distortion, and other types of deformation of the order of micrometers. A very thin air layer that is not shown but has a thickness of the order of micrometers is therefore present between the wavelength converter 47 and the substrate 43.

As described above, when the excitation light E enters the wavelength converter 47, heat is generated in the light incident area T of the wavelength converter 47, on which the excitation light E is incident. Thereafter, when the heat propagates to the area around the light incident area T, members that form the wavelength conversion element 32 expand due to the heat. In this process, if the wavelength converter 47 is joined to the substrate 43 via a joint, as in the wavelength conversion element in JP-A-2018-25750, the differences in coefficient of linear expansion among the members cause stress to be induced in the members, resulting in deformation of the wavelength converter 47, or when part of the phosphor is fragile, the wavelength converter 47 is broken or otherwise damaged.

To address the problem described above, in the wavelength conversion element 32 according to the present embodiment, even when the heat generated in the wavelength converter 47 increases the temperatures of the members that form the wavelength conversion element 32 and therefore expand the members, so that differences in coefficient of linear expansion cause expansion of the wavelength converter 47 and the substrate 43, the wavelength converter 47 is not directly joined to the substrate 43 and the wavelength converter 47 and the substrate 43 are free to expand by different degrees. Therefore, as an effect provided by the wavelength conversion element 32 in the present embodiment, deformation and breakage of the wavelength converter 47 resulting from the expansion of the substrate 43 are unlikely to occur.

In the wavelength conversion element 32 according to the present embodiment, no joint made of silicone resin or any other material is used as a component that joins the wavelength converter 47 to the substrate 43, whereby there is no concern about degradation of the joint due to light or heat.

Further, in the wavelength conversion element 32 according to the present embodiment, the presence of the very thin air layer between the wavelength converter 47 and the substrate 43 provides the following advantages and effects.

In the wavelength conversion element 32 according to the present embodiment, the fluorescence Y isotropically radiated in the wavelength converter 47 travels through the interior of the wavelength converter 47 while hitting the pores and other scattering components so that the fluorescence Y is scattered. Part of the fluorescence Y reaches the first surface 47a of the wavelength converter 47, and the reminder of the fluorescence Y reaches the second surface 47b of the wavelength converter 47. The fluorescence Y having reached the first surface 47a excluding the components that are incident on the first surface 47a at angles greater than or equal to the critical angle and therefore undergo total reflection and components incident on the first surface 47a at angles smaller than the critical angle and therefore undergo Fresnel-reflection passes through the first surface 47a and exits out of the wavelength conversion element 32. The two reflected components described above travel through the interior of the wavelength converter 47 while scattered again and reaches the first surface 47a or the second surface 47b.

On the other hand, out of the fluorescence Y having reached the second surface 47b, the light incident on the second surface 47b at angles of incidence greater than or equal to the critical angle is totally reflected off the second surface 47b with no loss and travels through the interior of the wavelength converter 47 while scattered again.

Out of the fluorescence Y incident on the second surface 47b at angles of incidence smaller than the critical angle, components that have not been reflected off the second surface 47b pass through the second surface 47b and are reflected off the reflection layer 41 of the substrate 43. The silver that forms the reflection layer 41 and has high optical reflectance, however, has light absorptivity of about 2%, so that the intensity of the fluorescence Y decreases whenever the fluorescence Y is incident on the reflection layer 41. Out of the fluorescence Y emitted in the wavelength converter 47, the majority of the components that do not exit out of the wavelength conversion element 32 corresponds to components absorbed by the reflection layer 41. Therefore, to increase the light emission efficiency at which the fluorescence Y is emitted, it is important to maximize the amount of fluorescence Y reflected off the second surface 47b before the fluorescence Y reaches the reflection layer 41.

In the present specification, the "light emission efficiency" is defined by the following Expressions (1) and (2).

Light emission efficiency=(amount of light that exits out of wavelength converter/amount of excitation light that enters wavelength converter) (1)

Amount of light that exits out of wavelength converter=amount of exiting fluorescence+ amount of exiting unconverted excitation light (2)

The distribution of the radiated fluorescence Y in the wavelength converter 47 is substantially isotropic in all directions. Therefore, the smaller the critical angle at the second surface 47b, the greater the amount of fluorescence Y reflected off the second surface 47b and the smaller the amount of fluorescence Y incident on the reflection layer 41. In the wavelength conversion element 32 according to the present embodiment, the very thin air layer having a refractive index smaller than the refractive index of any joint is present below the light incident area T, on which the excitation light E is incident, whereby the critical angle at the second surface 47b can be reduced as compared, for example, with a wavelength conversion element of related art in which a joint is provided between the wavelength converter and the substrate. Therefore, in the wavelength conversion element 32 according to the present embodiment, the amount of fluorescence Y incident on the reflection layer 41 can be reduced, so that the loss of the fluorescence Y at the reflection layer 41 can be reduced, whereby the light emission efficiency can be increased, as compared with the wavelength conversion element of related art.

Further, in the wavelength conversion element 32 according to the present embodiment, in which the wavelength converter 47 is in direct contact with the substrate 43 with the very thin air layer present between the wavelength converter 47 and the substrate 43, the heat generated in the wavelength converter 47 is likely to be conducted to the substrate 43. The decrease in the light emission efficiency resulting from the increase in the temperature of the wavelength converter 47 can therefore be suppressed.

In the present embodiment, since the rotating wavelength conversion element 32 is irradiated with the excitation light E, no fluorescence Y is emitted from the wavelength converter 47 in the periods for which the excitation light E passes through the plurality of first holders 371. The problem of no fluorescence Y can be addressed, for example, by controlling the timing at which the first light source 10 is turned on in such a way that the excitation light E is not radiated at the timing when the excitation light E passes through the locations of the first holders 371 or actively using the excitation light E reflected off the first holders 371 as the blue light for illumination light when the excitation light E passes through the locations of the first holders 371.

The first illuminator 100 according to the first embodiment described above provides the following effects.

Since the first illuminator 100 in the present embodiment includes the wavelength conversion element 32 described above, the first illuminator 100 achieved by the first embodiment excels in reliability of the wavelength conversion element 32.

Further, in the first illuminator 100 in the present embodiment, the motor 50 (rotator) can change the position where the excitation light E is incident on the wavelength converter 47 over time, whereby the increase in the temperature of the wavelength converter 47 can be suppressed. The first illuminator 100 provided in the present embodiment can therefore suppress the decrease in the light emission efficiency of the wavelength converter 47 and reduce the loss of the fluorescence Y.

The projector 1 according to the first embodiment described above provides the following effect.

The projector 1 according to the present embodiment, which includes the first illuminator 100 described above, can display a high-luminance image.

Second Embodiment

A second embodiment of the present disclosure will be described below with reference to FIGS. 5 and 6.

The configurations of a projector and an illuminator according to the second embodiment are the same as those in the first embodiment, and the second embodiment differs from the first embodiment in terms of the configuration of the wavelength conversion element. The entire projector and illuminator will therefore not be described.

Figure 5:
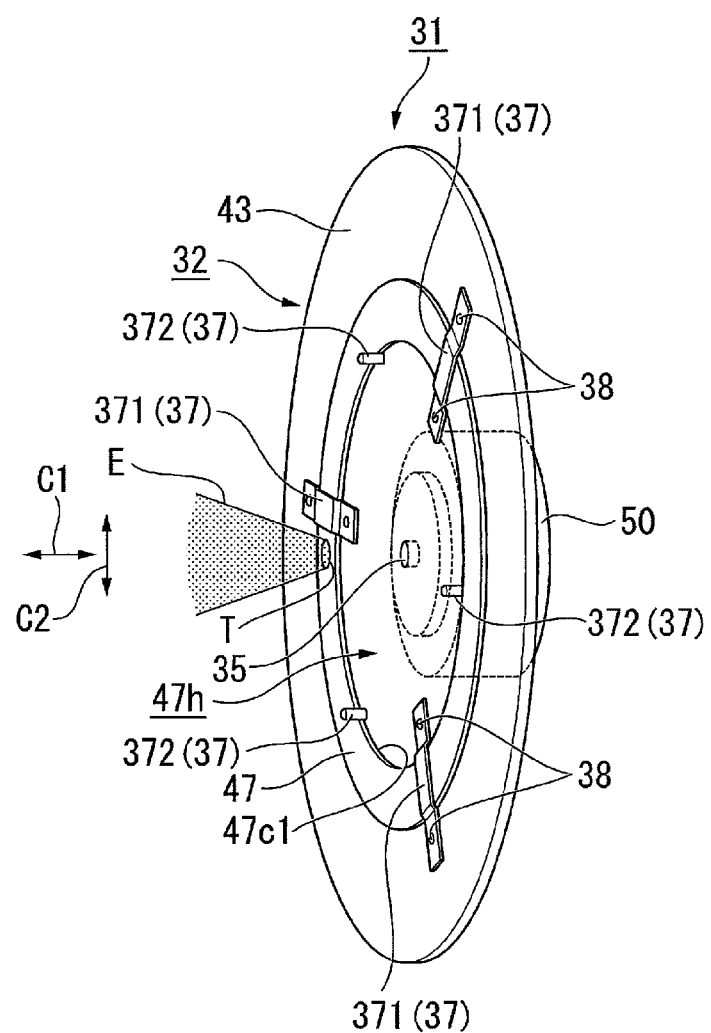
FIG. 5 is a perspective view of a wavelength conversion apparatus according to a second embodiment.

FIG. 5 is a perspective view of a wavelength conversion apparatus according to the second embodiment. FIG. 6 is a front view of the wavelength conversion apparatus according to the second embodiment.

Figure 6:
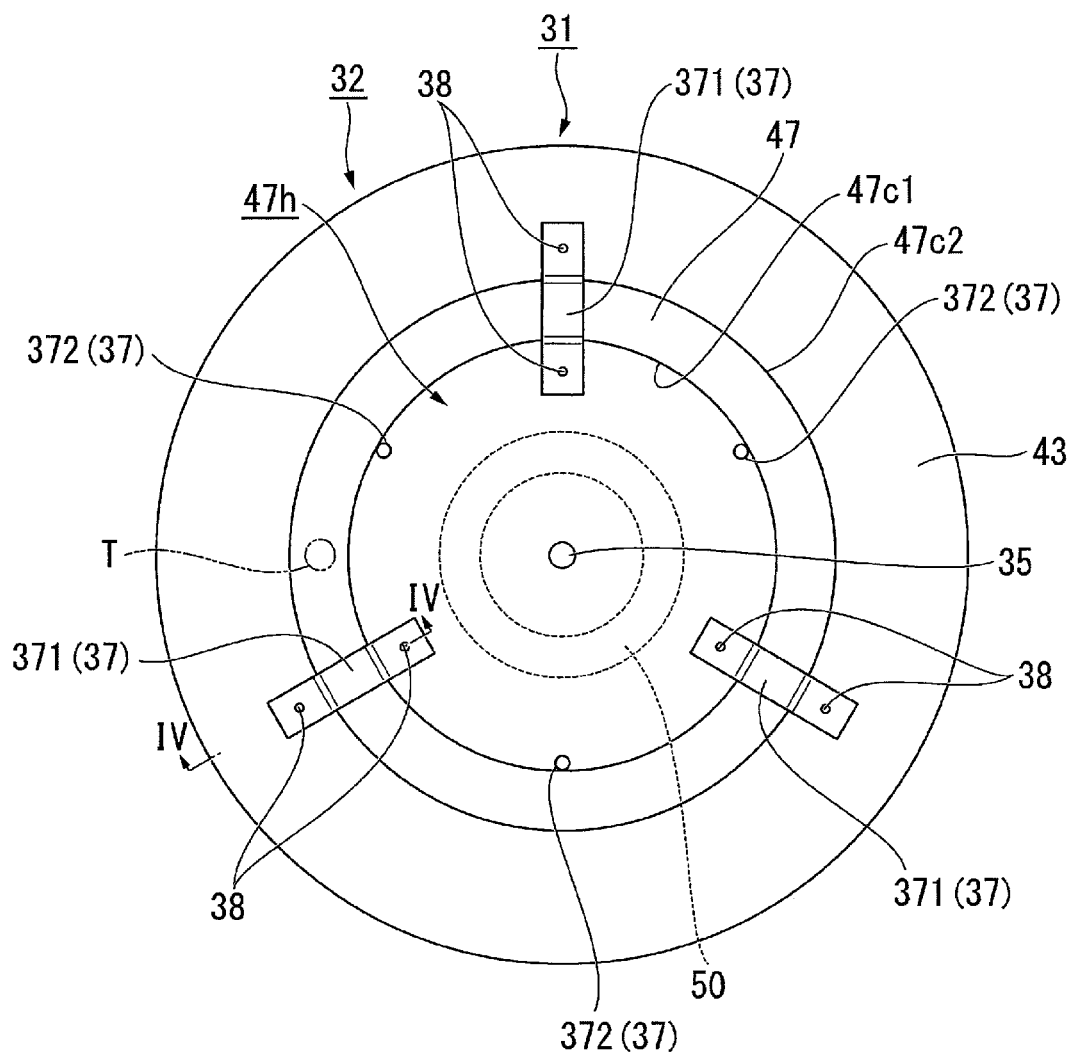
FIG. 6 is a front view of the wavelength conversion apparatus.

In FIGS. 5 and 6, components common to those in FIGS. and 3 in the first embodiment have the same reference characters and will not be described. The cross-sectional structure taken along the line IV-IV in FIG. 6 is the same as that in FIG. 4 in the first embodiment and is therefore not shown in the present embodiment.

A wavelength conversion element 31 according to the present embodiment includes the substrate 43, the wavelength converter 47, the holder 37, and the fixers 38, as shown in FIGS. 5 and 6. The holder 37 includes the plurality of first holders 371 and a plurality of second holders 372.

The holder 37 is so provided as to face the first surface 47a or the third surfaces 47c1 and 47c2 of the wavelength converter 47 and holds the wavelength converter 47 in the direction C1, in which the excitation light E is incident, and in the direction C2, which intersects the light incident direction.

The plurality of second holders 372 are disposed with a gap therebetween in the circumferential direction of the wavelength converter 47, as are the plurality of first holders 371. The number of second holders 372 or the arrangement thereof is not limited to a specific number or a specific arrangement, and three or more second holders 372 are desirably provided at substantially equal intervals.

The second holders 372 restrict movement of the wavelength converter 47 in a direction along the first surface 40a of the substrate body 40, in other words, in the direction C2, which intersects the direction in which the excitation light E is incident. The second holders 372 are each formed, for example, of a pin provided on the first surface 40a of the substrate body 40. The pin may be formed of a member separate from the substrate body 40 or may be integrated with the substrate body 40. The plurality of second holders 372 are each in contact with the third surface 47c1, which is the inner-circumferential side surface of the wavelength converter 47. The movement of the wavelength converter 47 in the direction along the first surface 40a of the substrate body 40 is thus restricted by the plurality of second holders 372.

All the second holders 372 are not necessarily in contact with the third surface 47c1 of the wavelength converter 47. Part of the second holders 372 may be in contact with the third surface 47c1, and the remaining second holders 372 may be separate from the third surface 47c1. Still instead, all the second holders 372 may be separate from the third surface 47c1 of the wavelength converter 47. In other words, a gap may be present between at least part of the second holder 372 and the third surface 47c1 of the wavelength converter 47. Also in these cases, the wavelength converter 47 cannot move freely in the direction along the first surface 40a of the substrate body 40, and the second holders 372 restrict movement of the wavelength converter 47. That is, the situation in which "movement of the wavelength converter 47 is restricted" in the present specification is a concept including a situation in which the wavelength converter 47 may not be allowed to move at all or the wavelength converter 47 may slightly move and the wavelength converter 47 may then not be allowed to move any more.

The second holders 372 are each formed of a member that physically restricts movement of the wavelength converter 47 based, for example, on the configuration in which the second holder 372 comes into contact with the wavelength converter 47. The second holders 372 therefore include no glueing material, adhesive material, or material that directly joins the wavelength converter 47 to the substrate 43 as a material that holds the wavelength converter 47.

The other configurations of the wavelength conversion apparatus are the same as those in the first embodiment.

The present embodiment also provides the same effects as those provided by the first embodiment, for example, the reliability and the light emission efficiency of the wavelength conversion element 31 can be increased.

Further, in the present embodiment, since the plurality of second holders 372 restrict the movement of the wavelength converter 47 in the direction along the first surface 40a of the substrate body 40, the wavelength converter 47 can be more reliably held in the direction C2, which intersects the direction in which the excitation light E is incident. Moreover, in the step of assembling the wavelength conversion element 31, the wavelength converter 47 is positioned by the second holder 372 when the first holders 371 are fixed to the substrate 43, whereby the first holders 371 are readily fixed.

Third Embodiment

A third embodiment of the present disclosure will be described below with reference to FIG. 7.

The configurations of a projector and an illuminator according to the third embodiment are the same as those in the first embodiment, and the third embodiment differs from the first embodiment in terms of the configuration of the wavelength conversion element. The entire projector and illuminator will therefore not be described.

Figure 7:
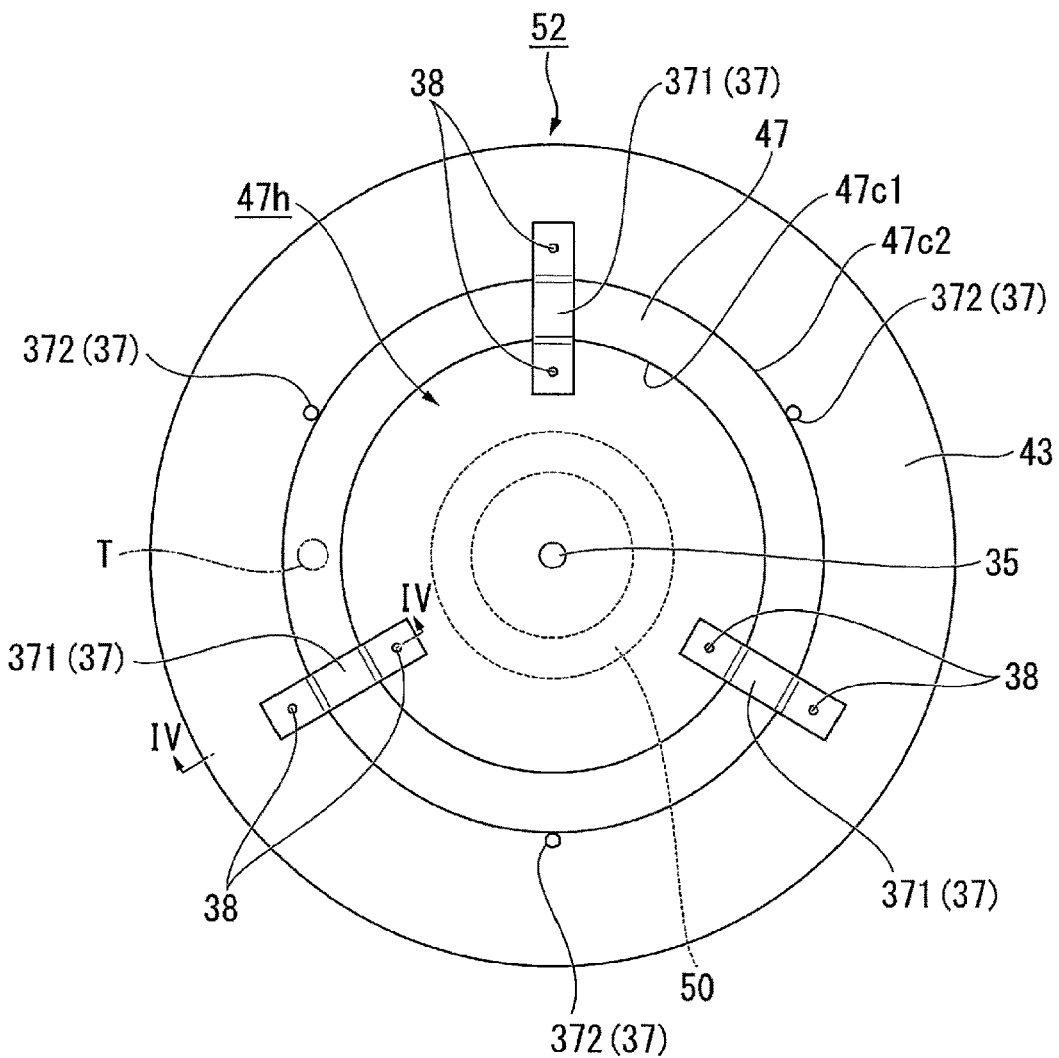
FIG. 7 is a front view of a wavelength conversion apparatus according to a third embodiment.

FIG. 7 is a front view of a wavelength conversion apparatus according to the third embodiment.

In FIG. 7, components common to those in FIG. 3 in the first embodiment have the same reference characters and will not be described. The cross-sectional structure taken along the line IV-IV in FIG. 7 is the same as that in FIG. 4 in the first embodiment and is therefore not shown in the present embodiment.

A wavelength conversion element 52 according to the present embodiment includes the substrate 43, the wavelength converter 47, the holder 37, and the fixers 38, as shown in FIG. 7. The holder 37 includes the plurality of first holders 371 and the plurality of second holders 372.

In the present embodiment, the first holders 371 are each formed of a plate spring member so provided as to extend over the wavelength converter 47 in the radial direction of the substrate 43, as in the first embodiment. The second holders 372 are each formed of a pin provided on the substrate 43, as in the second embodiment. In the present embodiment, however, the plurality of second holders 372 are each in contact with the third surface 47c2, which is the outer circumferential side surface of the wavelength converter 47, unlike in the second embodiment. The plurality of second holders 372 therefore restrict the movement of the wavelength converter 47 in the direction along the first surface of the substrate 43.

All the second holders 372 are not necessarily in contact with the fourth surface 47c2 of the wavelength converter 47, as in the second embodiment. Part of the second holders 372 may be in contact with the fourth surface 47c2, and the remaining second holders 372 may be separate from the fourth surface 47c2. Still instead, all the second holders 372 may be separate from the fourth surface 47c2 of the wavelength converter 47. In other words, a gap may be present between at least part of the second holder 372 and the fourth surface 47c2 of the wavelength converter 47. Also in these cases, the wavelength converter 47 cannot move freely in the direction along the first surface of the substrate 43, and the second holders 372 restrict the movement of the wavelength converter 47.

The other configurations of the wavelength conversion apparatus are the same as those in the first embodiment.

The present embodiment also provides the same effects as those provided by the first embodiment, for example, the reliability and the light emission efficiency of the wavelength conversion element 52 can be increased.

The wavelength conversion elements according to the first to third embodiments described above may have the following configurations.

Variation 1

Figure 8:
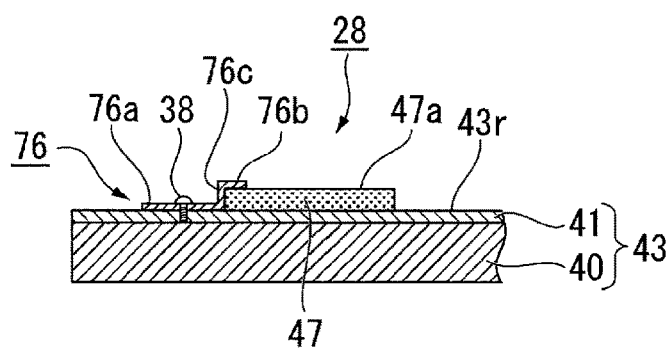
FIG. 8 is a cross-sectional view of a wavelength conversion element according to Variation 1 of the first to third embodiments.

FIG. 8 is a cross-sectional view of a wavelength conversion element according to Variation 1.

In FIG. 8, components common to those in FIG. 4 in the first embodiment have the same reference characters and will not be described.

In a wavelength conversion element 28 according to Variation 1, a holder 76 is formed, for example, of a plate made of stainless steel, as shown in FIG. 8. The plate may not be elastically deformed. The holder 76 includes two bent portions so bent as to intersect each other at substantially right angles.

The holder 76 includes a first section 76a, which faces the reflection surface 43r of the substrate 43, a second section 76b, which faces the first surface 47a of the wavelength converter 47, and a third section 76c, which links the first section 76a and the second section 76b to each other. The wavelength converter 47 has one end portion sandwiched between the second section 76b of the holder 76 and the substrate 43.

The fixer 38 is formed of a fixing member, for example, a pin or a bolt. The fixer 38 fixes the holder 76 to the substrate 43.

The second section 76b of the holder 76 may be in contact with the first surface 47a of the wavelength converter 47 or may be separate from the first surface 47a. The holder 76 may or may not press the wavelength converter 47.

Variation 2

Figure 9:
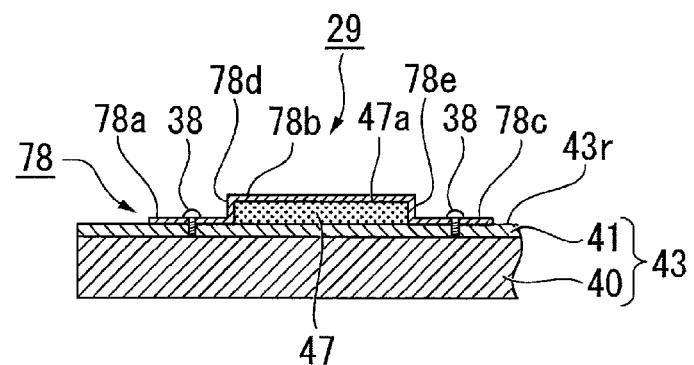
FIG. 9 is a cross-sectional view of a wavelength conversion element according to Variation 2 of the first to third embodiments.

FIG. 9 is a cross-sectional view of a wavelength conversion element according to Variation 2.

In FIG. 9, components common to those in FIG. 4 in the first embodiment have the same reference characters and will not be described.

In a wavelength conversion element 29 according to Variation 2, a holder 78 is formed, for example, of a plate made of stainless steel, as shown in FIG. 9. The plate may not be elastically deformed. The holder 78 includes fourth bent portions so bent as to intersect each other at substantially right angles.

The holder 78 includes a first section 78a, which is located at the side facing one end of the wavelength converter 47 and faces the reflection surface 43r of the substrate 43, a second section 78b, which faces the first surface 47a of the wavelength converter 47, a third section 78c, which is located at the side facing the other end of the wavelength converter 47 and faces the reflection surface 43r of the substrate 43, a fourth section 78d, which links the first section 78a and the second section 78b to each other, and a fifth section 78e, which links the second section 78b and the third section 78c to each other. The wavelength converter 47 is sandwiched between the holder 78 and the substrate 43.

The fixers 38 are each formed of a fixing member, for example, a pin or a bolt. The fixers 38 are provided at the first section 78a and the third section 78c of the holder 78 and fix the holder 78 to the substrate 43.

The second section 78b of the holder 78 may be in contact with the first surface 47a of the wavelength converter 47 or may be separate from the first surface 47a. The holder 78 may or may not press the wavelength converter 47.

Fourth Embodiment

A fourth embodiment of the present disclosure will be described below with reference to FIGS. 10 to 12.

The configurations of a projector and an illuminator according to the fourth embodiment are the same as those in the first embodiment, and the fourth embodiment differs from the first embodiment in terms of the configuration of the wavelength conversion element. The entire projector and illuminator will therefore not be described.

Figure 10:
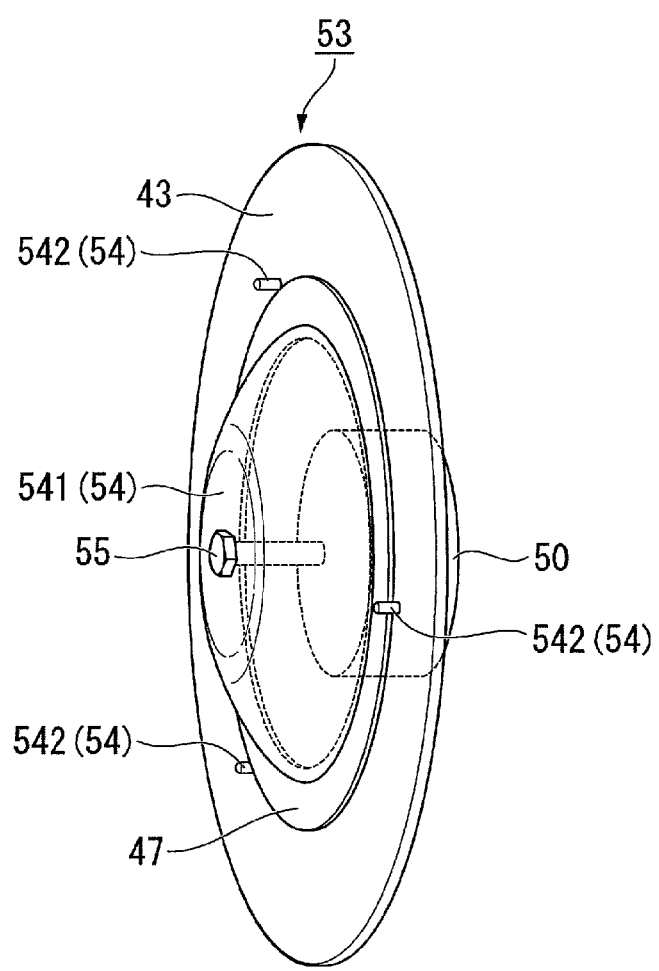
FIG. 10 is a perspective view of a wavelength conversion apparatus according to a fourth embodiment.

FIG. 10 is a perspective view of a wavelength conversion apparatus according to the fourth embodiment. FIG. 11 is a front view of the wavelength conversion apparatus. FIG. 12 is a cross-sectional view of the wavelength conversion apparatus taken along the line XII-XII in FIG. 11.

Figure 11:
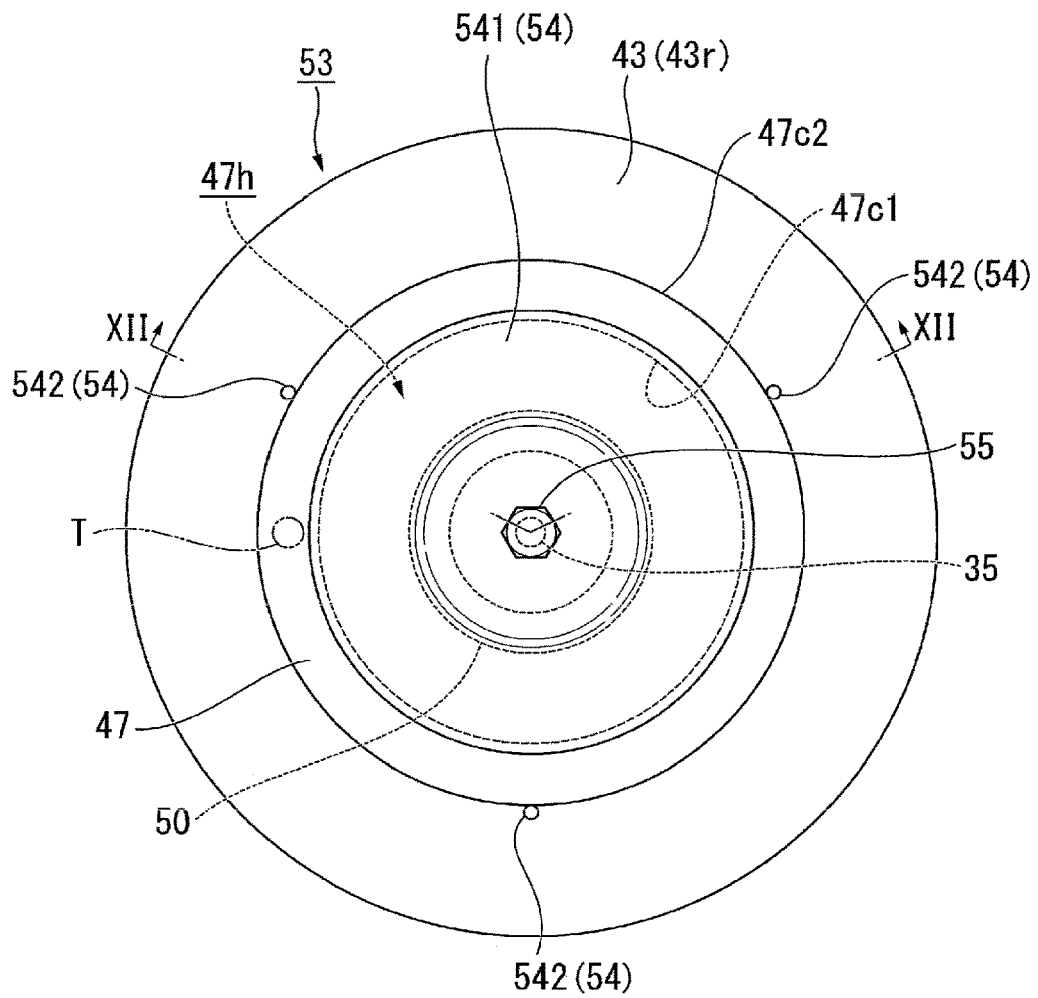
FIG. 11 is a front view of the wavelength conversion apparatus.
Figure 12:
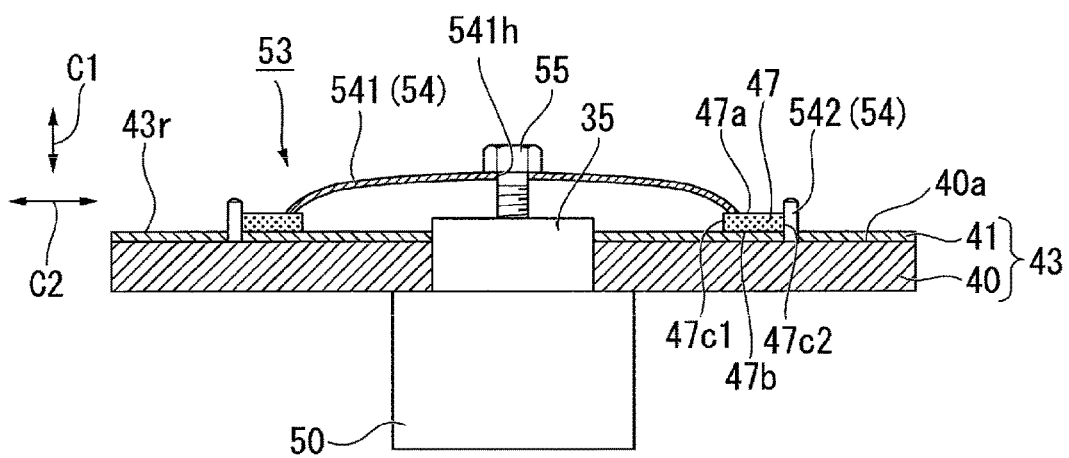
FIG. 12 is a cross-sectional view of the wavelength conversion apparatus taken along the line XII-XII in FIG. 11.

In FIGS. 10 to 12, components common to those in the drawing used in the first embodiment have the same reference characters and will not be described.

A wavelength conversion element 53 according to the present embodiment includes the substrate 43, the wavelength converter 47, a holder 54, and a fixer 55, as shown in FIGS. 10 to 12. The holder 54 includes a first holder 541 and a plurality of second holders 542.

The first holder 541 presses the wavelength converter 47 against the substrate 43 in a direction that intersects the first surface 40a of the substrate body 40, in other words, in the direction C1, in which the excitation light E is incident. The first holder 541 is formed, for example, of an elastically deformable plate spring member made of stainless steel. The plate spring member has the shape of a spherical shell part of which is truncated by a plane. The first holder 541 therefore has a circular shape when viewed in the direction in which the excitation light E is incident, as shown in FIG. 11.

The first holder 541 presses an inner edge portion of the wavelength converter 47 against the substrate 43 with an edge portion of the first holder 541 being in contact with the first surface 47a of the wavelength converter 47, as shown in FIG. 12. Part of the inner-edge-side area of the wavelength converter 47 overlaps with the edge portion of the first holder 541 when viewed in the direction in which the excitation light E is incident, as shown in FIG. 11. The light incident area T, on which the excitation light E is incident, is therefore provided in an area of the first surface 47a of the wavelength converter 47 that is an area where the first holder 541 does not overlap with the first surface 47a. That is, the holder 54 includes an elastically deformable member with part of the member overlapping with the opening 47h of the wavelength converter 47 and the remainder of the member overlapping with the inner edge portion of the wavelength converter 47 when viewed in the direction in which the excitation light E is incident.

In the present embodiment, the first holder 541 presses part of the inner-edge-side area of the wavelength converter 47 along the entire circumference and may instead press only a plurality of locations of the inner-edge-side area of the wavelength converter 47. For example, the first holder may press the annular wavelength converter 47 every 120° or at three locations.

The fixer 55 fixes the first holder 541 to the rotational shaft 35 of the motor 50. The fixer 55 is formed, for example, of a bolt and a nut. A hole 541h is provided at the center of the first holder 541. The bolt inserted through the hole 541h and fastened with the nut allows the first holder 541 to be fixed to the rotational shaft 35 of the motor 50. The pressure at which the first holder 541 is pressed against the wavelength converter 47 may be adjusted by adjusting the degree at which the bolt is fastened. The fixer 55 may be formed of a pin or any other member. The first holder 541 is thus fixed by the fixer 55 to the rotational shaft 35 in the portion where the first holder 541 overlaps with the opening 47h of the wavelength converter 47.

In the present embodiment, the plurality of second holders 542 are each formed of a pin, as in the second embodiment. The plurality of second holders 542 are each in contact with the fourth surface 47c2, which is the outer circumferential side surface of the wavelength converter 47. The plurality of second holders 542 thus restrict the movement of the wavelength converter 47 in the direction along the first surface 40a of the substrate body 40.

In the present embodiment, the first holder 541 is in oblique contact with the first surface 47a of the wavelength converter 47 in the directions outward from the center of the substrate 43, as shown in FIG. 12. The wavelength converter 47 is therefore pressed by the first holder 541 in the direction perpendicular to the first surface 47a and in the direction parallel to the first surface 47a from the side facing the inner edge thereof toward the side facing the outer edge thereof at the same time. The plurality of second holders 542 are therefore desirably provided on the side facing the outer circumference of the wavelength converter 47, as in the present embodiment. It is noted that the second holders 542 are not necessarily provided.

All the second holders 542 are not necessarily in contact with the fourth surface 47c2 of the wavelength converter 47, as in the first embodiment. Part of the second holders 542 may be in contact with the fourth surface 47c2, and the remaining second holders 542 may be separate from the fourth surface 47c2. Still instead, all the second holders 542 may be separate from the fourth surface 47c2 of the wavelength converter 47. In other words, a gap may be present between at least part of the second holder 542 and the fourth surface 47c2 of the wavelength converter 47. Also in these cases, the wavelength converter 47 cannot move freely in the direction along the first surface 40a of the substrate body 40, and the second holders 542 restrict the movement of the wavelength converter 47.

The other configurations of the wavelength conversion apparatus are the same as those in the first embodiment.

The present embodiment also provides the same effects as those provided by the first embodiment, for example, the reliability and the light emission efficiency of the wavelength conversion element 53 can be increased.

In the wavelength conversion element 53 according to the present embodiment, the first holder 541 does not extend over the wavelength converter 47, unlike in the first embodiment, so that there is no period for which no fluorescence Y is emitted from the wavelength converter 47. It is therefore unnecessary to temporarily prevent the excitation light E from being radiated, and the wavelength converter 47 can therefore be effectively used to keep emitting the fluorescence Y.

Fifth Embodiment

A fifth embodiment of the present disclosure will be described below with reference to FIG. 13.

The configurations of a projector and an illuminator according to the fifth embodiment are the same as those in the first embodiment, and the fifth embodiment differs from the first embodiment in terms of the configuration of the wavelength conversion element. The entire projector and illuminator will therefore not be described.

Figure 13:
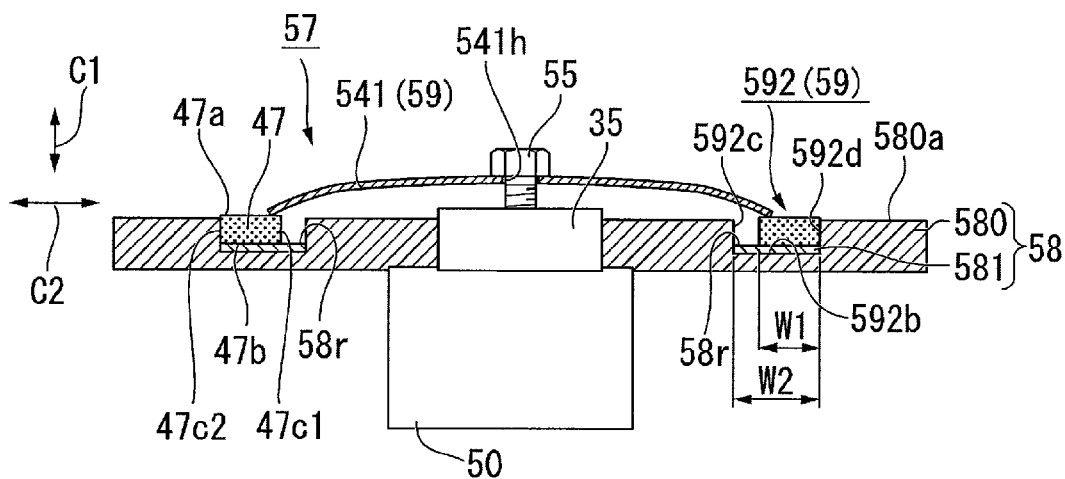
FIG. 13 is a cross-sectional view of a wavelength conversion apparatus according to a fifth embodiment.

FIG. 13 is a cross-sectional view of a wavelength conversion apparatus according to the fifth embodiment and corresponds to the cross-sectional view taken in the same position where the cross-sectional view of FIG. 12 in the fourth embodiment is taken.

In FIG. 13, components common to those in FIG. 12 in the fourth embodiment have the same reference characters and will not be described.

A wavelength conversion element 57 according to the present embodiment includes a substrate 58, the wavelength converter 47, a holder 59, and the fixer 55, as shown in FIG. 13. The holder 59 includes the first holder 541 and a second holder 592.

In the present embodiment, the first holder 541 is formed of a plate spring member having the shape of a spherical shell part of which is truncated, as in the fourth embodiment. The fixer 55 is formed of a bolt and a nut that fix the first holder 541 to the rotational shaft 35 of the motor 50, as in the fourth embodiment.

The second holder 592 is formed of a groove provided in a first surface 580a of a substrate body 580. The groove is provided in the form of annular groove around the rotational shaft 35. The second holder 592 has a bottom surface 592b, an inner wall surface 592c, which is located at the side facing the inner circumference of the substrate 58, and an outer wall surface 592d, which is located at the side facing the outer circumference of the substrate 58. A dimension W1 of the second holder 592 in the radial direction of the substrate 58 is greater than a dimension W2 of the wavelength converter 47 in the radial direction of the substrate 58. The wavelength converter 47 is accommodated in the second holder 592 with the wavelength converter 47 being separate from the inner wall surface 592c but in contact with the outer wall surface 592d and the bottom surface 592b. The second holder 592 thus restricts the movement of the wavelength converter 47 in the direction along the first surface 580a of the substrate body 580.

The depth of the second holder 592 (groove) is not limited to a specific value. The depth of the second holder 592 may be equal to the thickness of the wavelength converter 47, may be smaller than the wavelength converter 47, or may be greater than the wavelength converter 47.

The substrate 58 includes the substrate body 580 and a reflection layer 581. The reflection layer 581 is formed of a metal film made, for example, of silver and provided on the bottom surface 592b of the second holder 592. The substrate 58 therefore has a reflection surface 58r. The reflection layer 581 may be provided also on the inner wall surface 592c or the outer wall surface 592d in addition to the bottom surface 592b of the second holder 592.

The other configurations of the wavelength conversion apparatus are the same as those in the first embodiment.

The present embodiment also provides the same effects as those provided by the first embodiment, for example, the reliability and the light emission efficiency of the wavelength conversion element 57 can be increased.

The present embodiment also further provides the same effects as those provided by the fourth embodiment, for example, the wavelength converter 47 can be effectively used to keep emitting the fluorescence Y because the same first holder 541 used in the fourth embodiment is used.

Sixth Embodiment

A sixth embodiment of the present disclosure will be described below with reference to FIGS. 14 to 16.

The configurations of a projector and an illuminator according to the sixth embodiment are the same as those in the first embodiment, and the sixth embodiment differs from the first embodiment in terms of the configuration of the wavelength conversion element. The entire projector and illuminator will therefore not be described.

Figure 14:
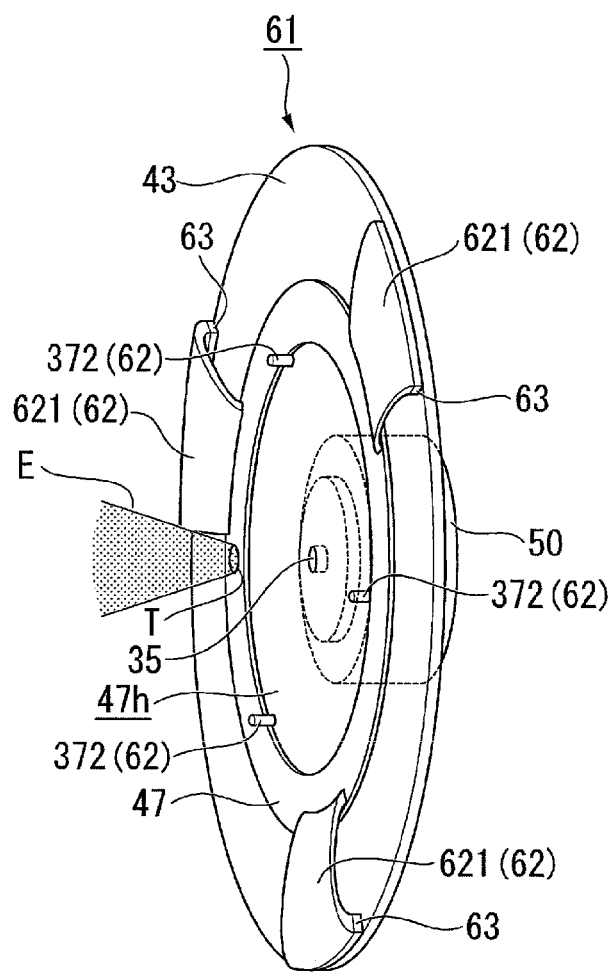
FIG. 14 is a perspective view of a wavelength conversion apparatus according to a sixth embodiment.

FIG. 14 is a perspective view of a wavelength conversion apparatus according to the sixth embodiment. FIG. 15 is a front view of the wavelength conversion apparatus. FIG. 16 is a cross-sectional view of the wavelength conversion apparatus taken along the line XVI-XVI in FIG. 15.

Figure 15:
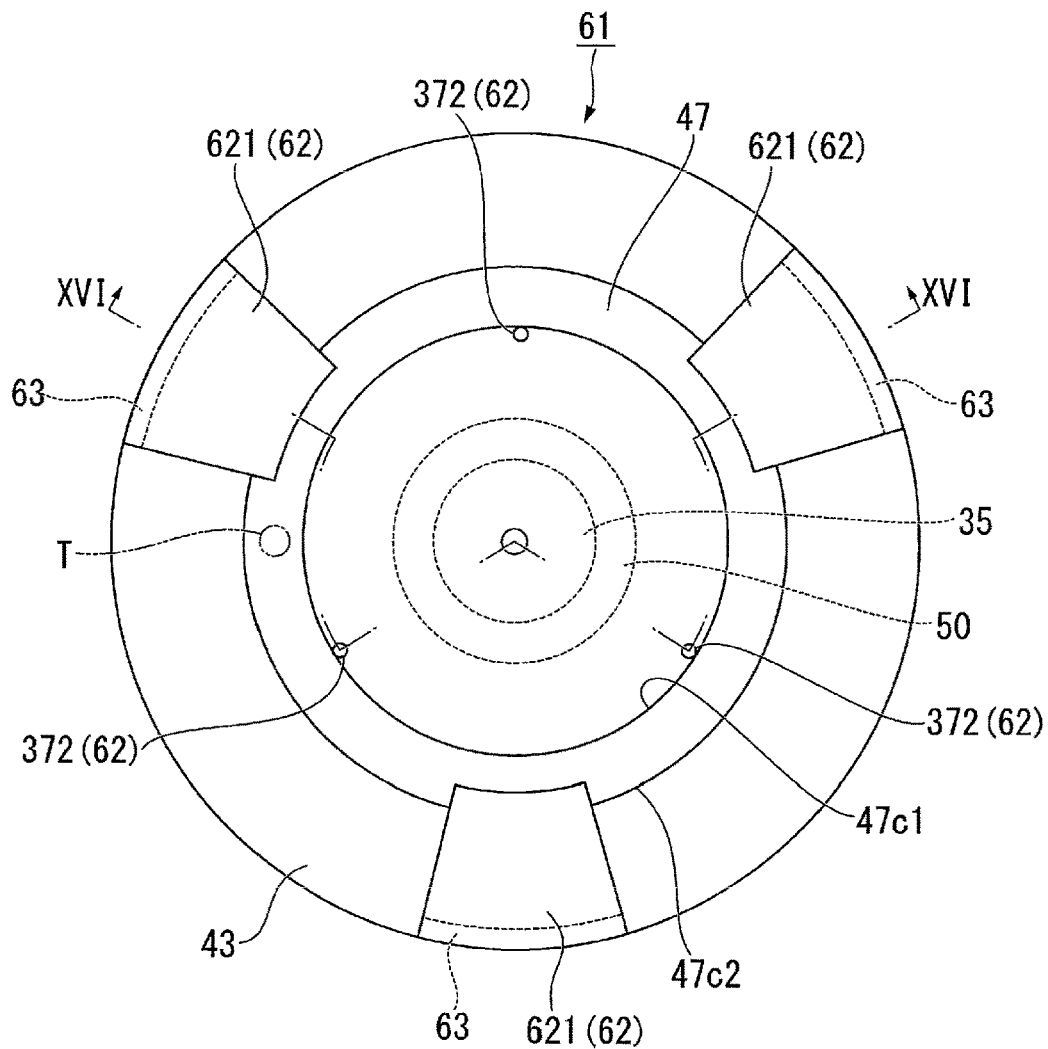
FIG. 15 is a front view of the wavelength conversion apparatus.
Figure 16:
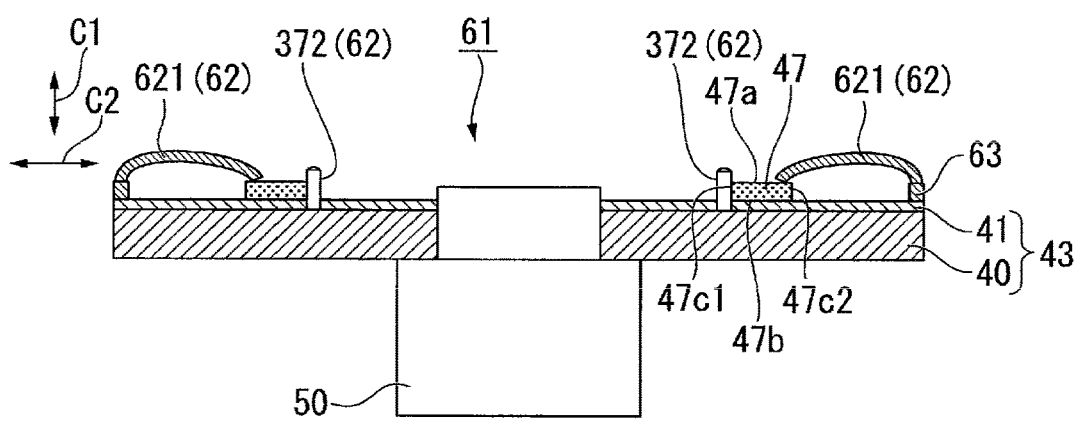
FIG. 16 is a cross-sectional view of the wavelength conversion apparatus taken along the line XVI-XVI in FIG. 15.

In FIGS. 14 to 16, components common to those in the drawing used in the first embodiment have the same reference characters and will not be described.

A wavelength conversion element 61 according to the present embodiment includes the substrate 43, the wavelength converter 47, a holder 62, and fixer3 63, as shown in FIGS. 14 to 16. The holder 62 includes a plurality of first holders 621 and the plurality of second holders 372.

The first holders 621 press the wavelength converter 47 against the substrate 43 in a direction that intersects the first surface 40a of the substrate body 40, in other words, in the direction C1, in which the excitation light E is incident. The first holders 621 are each formed, for example, of an elastically deformable plate spring member made of stainless steel. The plate spring member has the shape of an annularly curved cylinder part of which is cut. The first holders 621 therefore each have a fan-like shape when viewed in the direction in which the excitation light E is incident, as shown in FIG. 15.

The first holders 621 press an outer edge portion of the wavelength converter 47 against the substrate 43 with an edge portion of each of the first holders 621 being in contact with the first surface 47a of the wavelength converter 47, as shown in FIG. 16. Part of the outer-edge-side area of the wavelength converter 47 overlaps with the edge portion of each of the first holders 621 when viewed in the direction in which the excitation light E is incident, as shown in FIG. 15. The light incident area T, on which the excitation light E is incident, is therefore provided in an area of the first surface 47a of the wavelength converter 47 that is an area where the first holders 621 do not overlap with the first surface 47a. That is, the holder 62 includes elastically deformable members with part of each of the members overlapping with the area outside the wavelength converter 47 and the remainder of the member overlapping with the outer edge portion of the wavelength converter 47 when viewed in the direction in which the excitation light E is incident.

The plurality of first holders 621 are disposed with a gap therebetween in the circumferential direction of the substrate 43. In the present embodiment, three first holders 621 are disposed at equal intervals in the circumferential direction of the substrate 43. The number of first holders 621 and the intervals at which the first holders 621 are disposed are, however, not limited to specific values. In the present embodiment, the plurality of first holders 621 press a plurality of locations of the outer-edge-side area of the wavelength converter 47. Instead, for example, a single annular first holder may press the outer-edge-side area of the wavelength converter 47 along the entire circumference.

The fixers 63 fix the plurality of first holders 621 to the substrate 43. The fixers 63 may each be formed of a pin, a bolt, or any other member or may be formed of an adhesive. The first holders 621 are thus fixed by the fixers 63 to the substrate 43 in a portion outside the wavelength converter 47.

The plurality of second holders 372 are each formed of a pin, as in the first embodiment. The plurality of second holders 372 are each in contact with the third surface 47c1, which is the inner circumferential side surface of the wavelength converter 47. The plurality of second holders 372 thus restrict the movement of the wavelength converter 47 in the direction along the first surface 40a of the substrate body 40.

In the present embodiment, the first holders 621 are in oblique contact with the first surface 47a of the wavelength converter 47 in the directions from an outer edge portion of the substrate 43 toward the center thereof, as shown in FIG. 16. The wavelength converter 47 is therefore pressed by the first holders 621 in the direction perpendicular to the first surface 47a and in the direction parallel to the first surface 47a from the side facing the outer edge thereof toward the side facing the inner edge thereof at the same time. The plurality of second holders 372 are therefore desirably provided on the side facing the inner edge of the wavelength converter 47, as in the present embodiment. It is noted that the second holders 372 are not necessarily provided.

All the second holders 372 are not necessarily in contact with the third surface 47c1 of the wavelength converter 47, as in the second embodiment. Part of the second holders 372 may be in contact with the third surface 47c1, and the remaining second holders 372 may be separate from the third surface 47c1. Still instead, all the second holders 372 may be separate from the third surface 47c1 of the wavelength converter 47.

The other configurations of the wavelength conversion apparatus are the same as those in the first embodiment.

The present embodiment also provides the same effects as those provided by the first embodiment, for example, the reliability and the light emission efficiency of the wavelength conversion element 61 can be increased.

In the present embodiment, the first holders 621 do not extend over the wavelength converter 47, unlike in the first embodiment, so that there is no period for which no fluorescence Y is emitted from the wavelength converter 47. It is therefore unnecessary to temporarily prevent the excitation light E from being radiated, and the wavelength converter 47 can therefore be effectively used to keep emitting the fluorescence Y.

Seventh Embodiment

A seventh embodiment of the present disclosure will be described below with reference to FIG. 17.

The configurations of a projector and an illuminator according to the seventh embodiment are the same as those in the first embodiment, and the seventh embodiment differs from the first embodiment in terms of the configuration of the wavelength conversion element. The entire projector and illuminator will therefore not be described.

Figure 17:
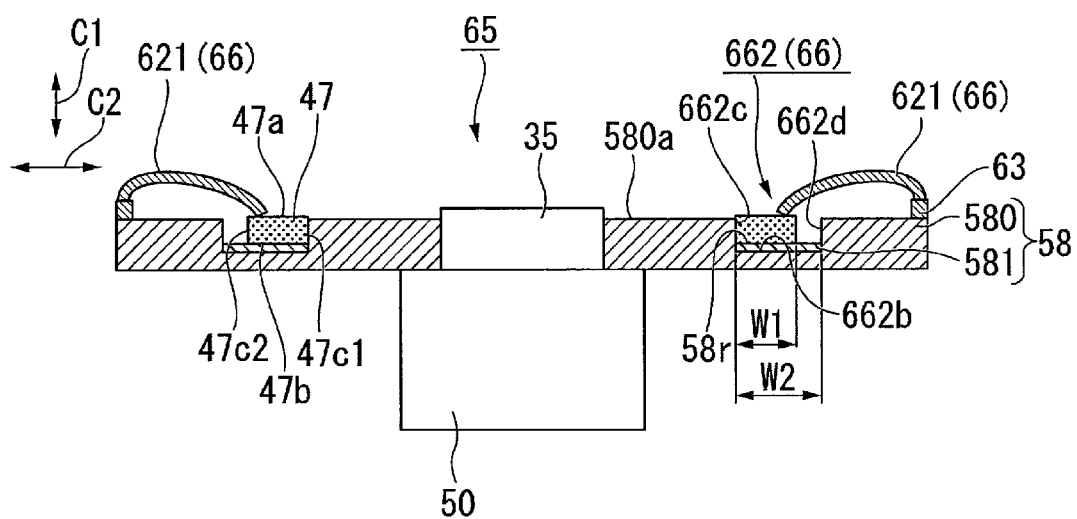
FIG. 17 is a cross-sectional view of a wavelength conversion apparatus according to a seventh embodiment.

FIG. 17 is a cross-sectional view of a wavelength conversion apparatus according to the seventh embodiment and corresponds to FIG. 13 in the fifth embodiment and FIG. 16 in the sixth embodiment.

In FIG. 17, components common to those in FIG. 13 in the fifth embodiment and FIG. 16 in the sixth embodiment have the same reference characters and will not be described.

A wavelength conversion element 65 according to the present embodiment includes the substrate 58, the wavelength converter 47, a holder 66, and the fixers 63, as shown in FIG. 17. The holder 66 includes the plurality of first holders 621 and a second holder 662.

The first holders 621 are each formed of a plate spring member having the shape of a cylinder part of which is cut, as in the sixth embodiment. The fixers 63 are each formed of a bolt, a pin, an adhesive, or any other member that fixes the corresponding first holder 621 to the substrate 58.

The second holder 662 is formed of a groove provided in the first surface 580a of a substrate body 580, as in the fifth embodiment. The groove is provided in the form of annular groove around the rotational shaft 35. The second holder 662 has a bottom surface 662b, an inner wall surface 662c, which is located at the side facing the inner circumference of the substrate 58, and an outer wall surface 662d, which is located at the side facing the outer circumference of the substrate 58. A dimension W1 of the second holder 662 in the radial direction of the substrate 58 is greater than a dimension W2 of the wavelength converter 47 in the radial direction of the substrate 58. The wavelength converter 47 is accommodated in the second holder 662 with the wavelength converter 47 being separate from the outer wall surface 662d but in contact with the inner wall surface 662c and the bottom surface 662b. The second holder 662 thus restricts the movement of the wavelength converter 47 in the direction along the first surface 580a of the substrate body 580.

The other configurations of the wavelength conversion apparatus are the same as those in the first embodiment.

The present embodiment also provides the same effects as those provided by the first embodiment, for example, the reliability and the light emission efficiency of the wavelength conversion element 65 can be increased.

The present embodiment also further provides the same effects as those provided by the sixth embodiment, for example, the wavelength converter 47 can be effectively used to keep emitting the fluorescence Y because the same first holders 621 used in the sixth embodiment are used.

Eighth Embodiment

An eighth embodiment of the present disclosure will be described below with reference to FIGS. 18 and 19.

A schematic configuration of a projector according to the eighth embodiment is the same as that in the first embodiment, and the eighth embodiment differs from the first embodiment in terms of the configuration of the wavelength conversion apparatus. The entire projector will therefore not be described.

Figure 18:
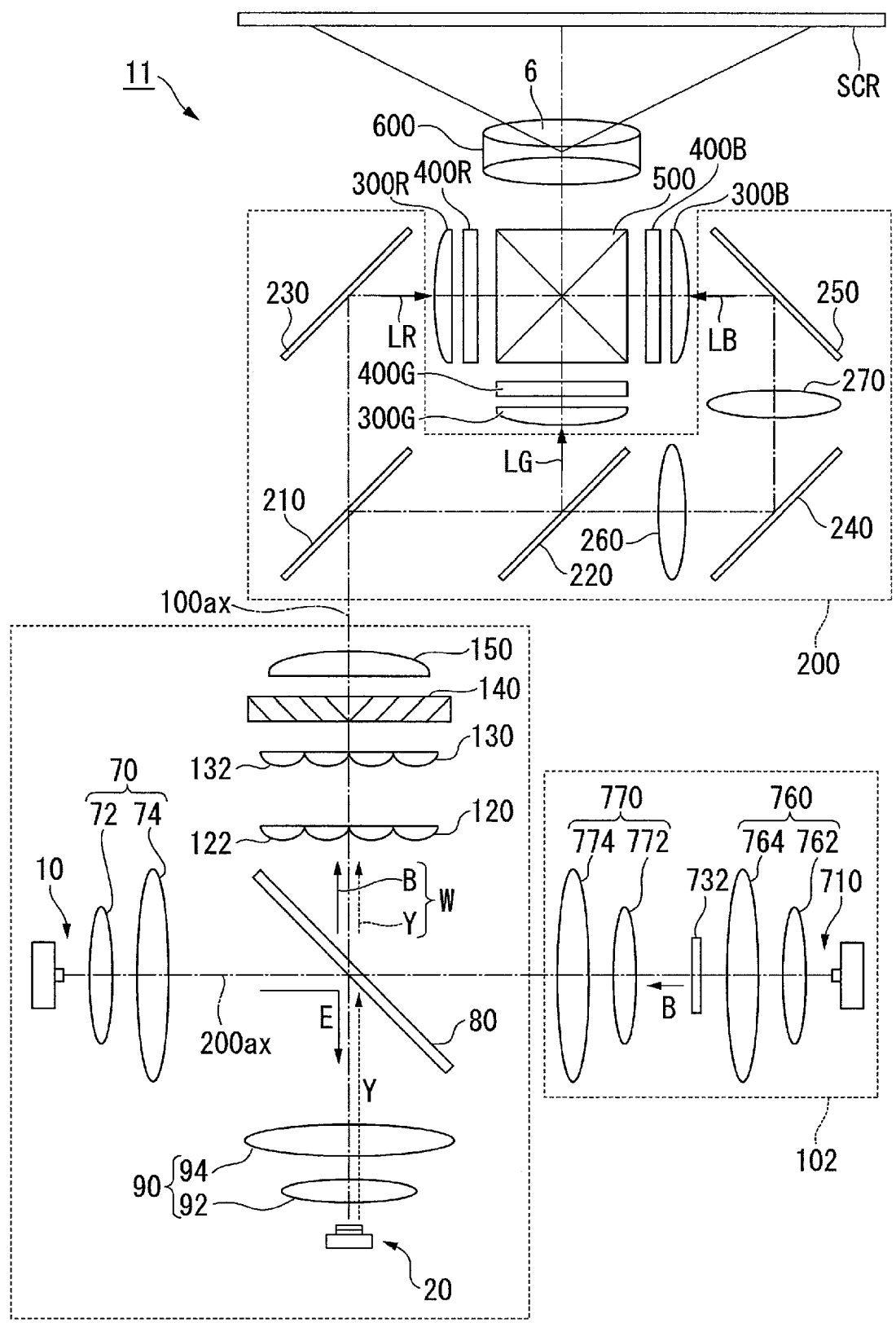
FIG. 18 is a schematic configuration diagram of a projector according to an eighth embodiment.

FIG. 18 is a schematic configuration diagram of a projector 11 according to the eighth embodiment. FIG. 19 is a perspective view of a wavelength conversion element.

In FIG. 18, components common to those in FIG. 1 have the same reference characters and will not be described.

A first illuminator 103 in the present embodiment includes a wavelength conversion element 20 but includes no motor (rotator) for rotating the wavelength conversion element 20, as shown in FIG. 18. The excitation light E outputted from the first light source 10 is therefore incident on the stationary wavelength conversion element 20.

Figure 19:
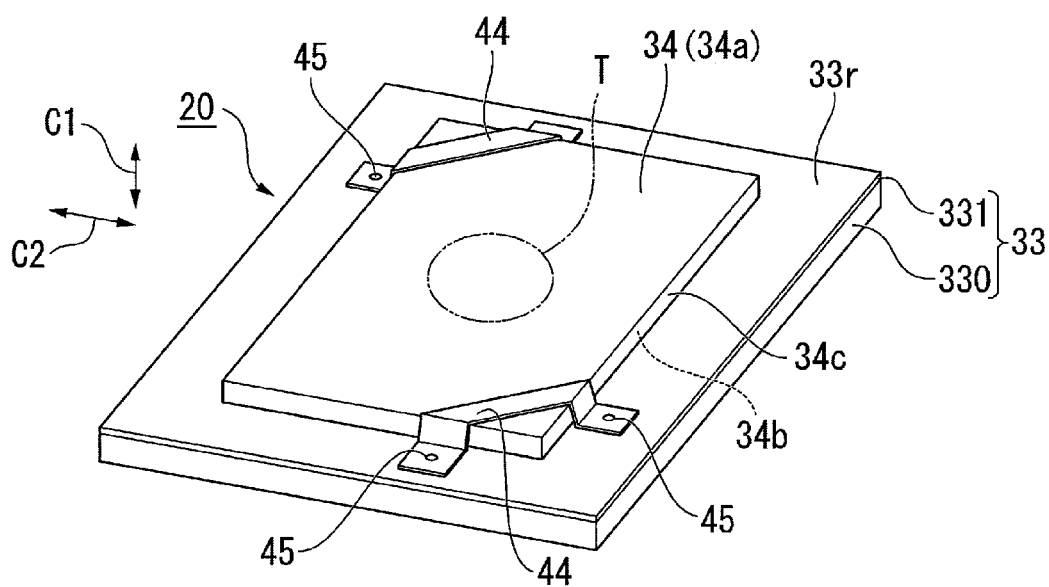
FIG. 19 is a perspective view of a wavelength conversion element.

The wavelength conversion element 20 according to the present embodiment includes a substrate 33, a wavelength converter 34, a plurality of holders 44, and a plurality of fixers 45, as shown in FIG. 19. The wavelength conversion element 20 outputs the fluorescence Y toward the side on which the excitation light E is incident, as shown in FIG. 18. That is, the wavelength conversion element 20 is a reflective wavelength conversion element.

The substrate 33 includes a substrate body 330 and a reflection layer 331. The substrate 33 has a reflection surface 33r, which reflects the fluorescence Y emitted from the wavelength converter 34. The substrate body 330 is made, for example, of a metal, such as aluminum. The reflection layer 331 is formed of a metal film made, for example, of silver.

The wavelength converter 34 includes a wavelength conversion layer. The wavelength converter 34 has a rectangular planar shape when viewed in the direction in which the excitation light E is incident. The wavelength converter 34 has a first surface 34a, on which the excitation light E, which belongs to the first wavelength band, is incident, a second surface 34b, which is located at the side opposite the first surface 34a, and a third surface 34c, which intersects the first surface 34a or the second surface 34b. The wavelength converter 34 contains, for example, a YAG-based phosphor and emits the yellow fluorescence Y. A dielectric multilayer film may be provided on a surface of the wavelength converter 34 that is the surface facing the reflection surface 33r.

The plurality of holders 44 press the wavelength converter 34 against the substrate 33 in a direction that intersects a first surface of the substrate 33, in other words, in the direction in which the excitation light E is incident. The holders 44 are each formed, for example, of a belt-shaped, elastically deformable plate spring member made of stainless steel. The holders 44 are so provided as to obliquely extend over the wavelength converter 34 at corners of the wavelength converter 34. In the present embodiment, the holders 44 are provided at two corners at opposite ends of a diagonal of the wavelength converter 34, but the number of holders 44 or the arrangement thereof is not limited to a specific number or a specific arrangement.

As described above, the holders 44 are so provided as to face the first surface 34a or the third surface 34c of the wavelength converter 34 and hold the wavelength converter 34 in the direction in which the excitation light E is incident and in a direction that intersects the light incident direction. Part of the area of the two corners of the wavelength converter 34 overlaps with the holders 44 when viewed in the direction in which the excitation light E is incident. The light incident area T, on which the excitation light E is incident, is therefore provided in an area of the first surface 34a of the wavelength converter 34 that is an area where the holders 44 do not overlap with the first surface 34a.

The opposite ends of each of the holders 44 are fixed by the fixers 45 to the substrate 33. The fixers 45 are each formed of a fixing member, for example, a pin or a bolt. The fixers 45 thus fix the holders 44 to the substrate 33. The holders 44 themselves are elastically deformed and curved, and the curved holders 44 and the substrate 33 sandwich the wavelength converter 34. The holders 44 thus press the wavelength converter 34 against the substrate 33 at appropriate pressure. The fixers 45 are so provided as to face the first surface 34a or the third surface 34c of the wavelength converter 34 and hold the wavelength converter 34 in the direction in which the excitation light E is incident and in a direction that intersects the light incident direction.

Also in the present embodiment, the wavelength converter 34 is not directly joined to the substrate 33, for example, via an adhesive, as in the first to seventh embodiments. The wavelength converter 34 is pressed by the holders 44 against the substrate 33 and is in direct contact with the substrate 33. The wavelength converter 34 and the substrate 33, however, each have minute irregularities, warpage, distortion, and other types of deformation of the order of micrometers. A very thin air layer that is not shown but has a thickness of the order of micrometers is therefore present between the wavelength converter 34 and the substrate 33.

The other configurations of the projector 11 are the same as those in the first embodiment.

The wavelength conversion element 20 according to the present embodiment also provides the same effects as those provided by the wavelength conversion elements according to the first to seventh embodiments. That is, in the wavelength conversion element 20 according to the present embodiment, even when the difference in coefficient of linear expansion between the wavelength converter 34 and the substrate 33 causes the wavelength converter 34 and the substrate 33 to expand by different degrees, the configuration in which the wavelength converter 34 and the substrate 33 are not directedly joined to each other causes large deformation or breakage of the wavelength converter 34 to be unlikely to occur, as an effect provided by the wavelength conversion element 20 according to the present embodiment.

In the wavelength conversion element 20 according to the present embodiment, no joint made of silicone resin or any other material is used as a component that joins the wavelength converter 34 to the substrate 33, whereby there is no concern about degradation of the joint due to light or heat.

In the wavelength conversion element 20 according to the present embodiment, the very thin air layer is present between the wavelength converter 34 and the substrate 33, whereby the critical angle at the second surface 34b of the wavelength converter 34 can be reduced as compared with a wavelength conversion element of related art in which no air layer is present. Therefore, in the wavelength conversion element 20 according to the present embodiment, the amount of fluorescence Y incident on the reflection layer 331 can be reduced, so that the loss of the fluorescence Y at the reflection layer 331 can be reduced, whereby the light emission efficiency can be increased, as compared with the wavelength conversion element of related art.

Ninth Embodiment

A ninth embodiment of the present disclosure will be described below with reference to FIG. 20.

The configurations of a projector and an illuminator according to the ninth embodiment are the same as those in the eighth embodiment, and the ninth embodiment differs from the eighth embodiment in terms of the configuration of the wavelength conversion element. The entire projector and illuminator will therefore not be described.

Figure 20:
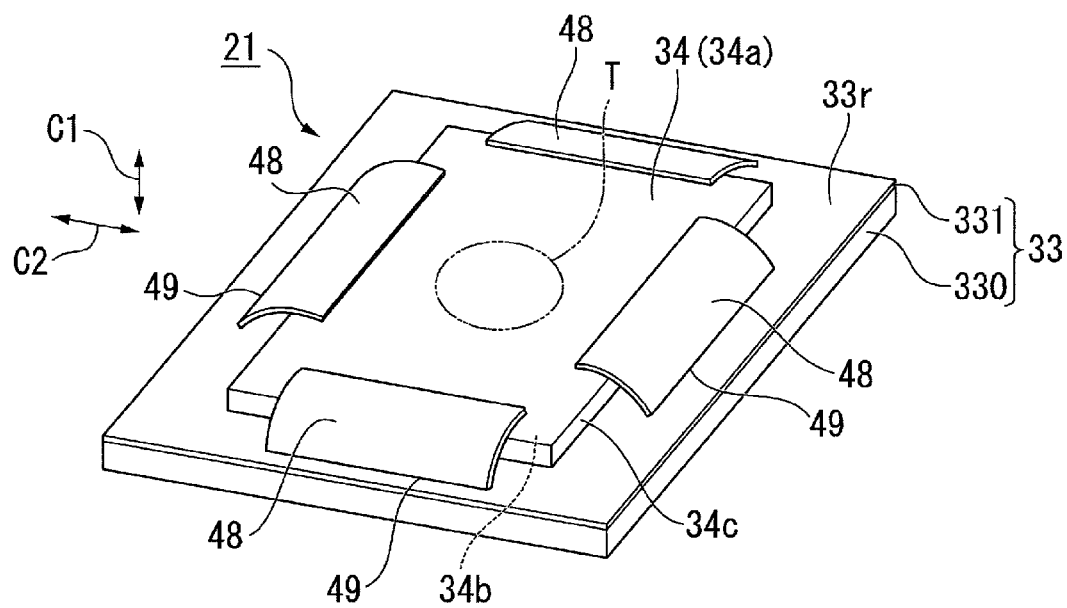
FIG. 20 is a perspective view of a wavelength conversion element according to a ninth embodiment.

FIG. 20 is a perspective view of the wavelength conversion element according to the ninth embodiment.

In FIG. 20, components common to those in FIG. 19 in the eighth embodiment have the same reference characters and will not be described.

A wavelength conversion element 21 according to the present embodiment includes the substrate 33, the wavelength converter 34, a plurality of holders 48, and the fixers 49.

The holders 48 press the wavelength converter 34 against the substrate 33 in the direction C1, in which the excitation light E is incident. The holders 48 are each formed, for example, of an elastically deformable plate spring member made of stainless steel. The plate spring member has the shape of an annularly curved cylinder part of which is cut. The holders 48 are provided along the four sides of the wavelength converter 34.

As described above, the plurality of holders 48 are so provided as to face the first surface 34a or the third surface 34c of the wavelength converter 34 and hold the wavelength converter 34 in the direction C1 in which the excitation light E is incident and in the direction C2, which intersects the light incident direction. The holders 48 press the wavelength converter 34 against the substrate 33 with an edge portion of each of the holders 48 being in contact with the first surface 34a of the wavelength converter 34. Part of an outer-edge-side area of the wavelength converter 34 overlaps with part of each of the holders 48 when viewed in the direction in which the excitation light E is incident. The light incident area T, on which the excitation light E is incident, is therefore provided in an area of the first surface 34a of the wavelength converter 34 that is an area that is close to the center of the first surface 34a and that does not overlap with the holders 48.

The fixers 49 fix the plurality of holders 48 to the substrate 33. The fixers 49 may each be formed of a pin, a bolt, or any other member or may be formed of an adhesive.

The present embodiment also provides the same effects as those provided by the eighth embodiment, for example, the reliability and the light emission efficiency of the wavelength conversion element 21 can be increased.

Tenth Embodiment

A tenth embodiment of the present disclosure will be described below with reference to FIG. 21.

The configurations of a projector and an illuminator according to the tenth embodiment are the same as those in the eighth embodiment, and the tenth embodiment differs from the eighth embodiment in terms of the configuration of the wavelength conversion element. The entire projector and illuminator will therefore not be described.

Figure 21:
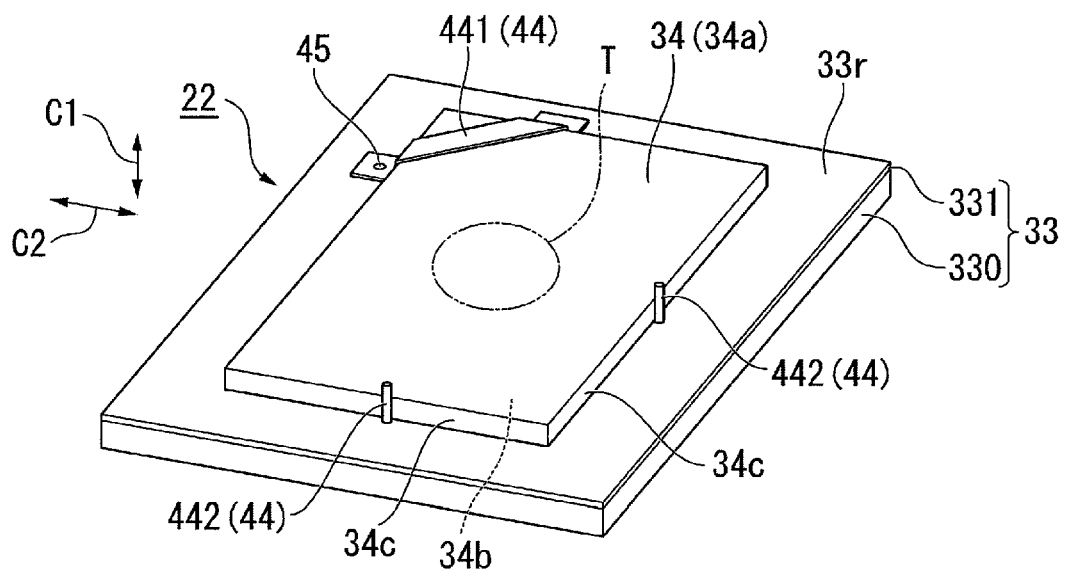
FIG. 21 is a perspective view of a wavelength conversion element according to a tenth embodiment.

FIG. 21 is a perspective view of the wavelength conversion element according to the tenth embodiment.

In FIG. 21, components common to those in FIG. 19 in the eighth embodiment have the same reference characters and will not be described.

A wavelength conversion element 22 according to the present embodiment includes the substrate 33, the wavelength converter 34, the holder 44, and the fixers 45. The holder 44 includes a first holder 441 and a plurality of second holders 442.

The first holder 441 presses the wavelength converter 34 against the substrate 33 in a direction that intersects a first surface of the substrate 33, in other words, in the direction C1, in which the excitation light E is incident. The first holder 441 is formed, for example, of a belt-shaped, elastically deformable plate spring member made of stainless steel. The first holder 441 is so provided as to obliquely extend over the wavelength converter 34 at one corner of the wavelength converter 34. That is, the first holder 441 is the same member as any of the holders 44 in the eighth embodiment.

The plurality of second holders 442 are each formed of a pin provided on the first surface of the substrate 33. The plurality of second holders 442 are provided in correspondence with two sides connected to the corner diagonally facing the corner where the first holder 441 is provided out of the four sides of the wavelength converter 34 in the plan view. The second holders 442 may be in contact with the third surface 34c of the wavelength converter 34 or may be separate from the third surface 34c. The plurality of second holders 442 thus restrict the movement of the wavelength converter 34 in the direction along the first surface of the substrate 33.

The other configurations of the wavelength conversion element 22 are the same as those in the first embodiment.

The tenth embodiment also provides the same effects as those provided by the eighth embodiment, for example, the reliability and the light emission efficiency of the wavelength conversion element 22 can be increased.

The wavelength conversion element 22 according to the tenth embodiment may have the following configurations.
Variation 1

Figure 22:
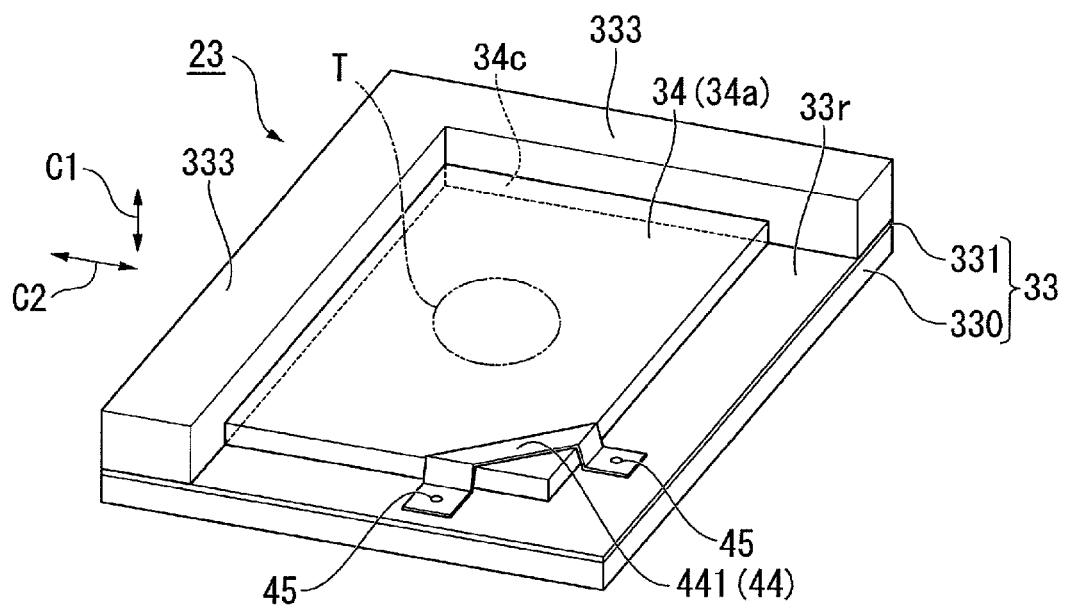
FIG. 22 is a perspective view of a wavelength conversion element according to Variation 1 of the tenth embodiment.

FIG. 22 is a perspective view of a wavelength conversion element according to Variation 1 of the tenth embodiment.

In FIG. 22, components common to those in FIG. 21 have the same reference characters and will not be described.

In a wavelength conversion element 23 according to Variation 1, wall sections 333, which protrude with respect to the other flat portions, are provided along two sides of the substrate 33 that are connected to the corner diagonally facing the corner where the first holder 441 is provided out of the four sides of the substrate 33 in the plan view, as shown in FIG. 22. The wall sections 333 may be in contact with the third surface 34c of the wavelength converter 34 or may be separate from the third surface 34c. The wall sections 333 thus restrict the movement of the wavelength converter 34 in the direction along the first surface of the substrate 33. That is, the second holders may be formed of the wall sections 333.
Second Variation FIG. 23 is a perspective view of a wavelength conversion element according to Variation 2 of the tenth embodiment.

Figure 23:
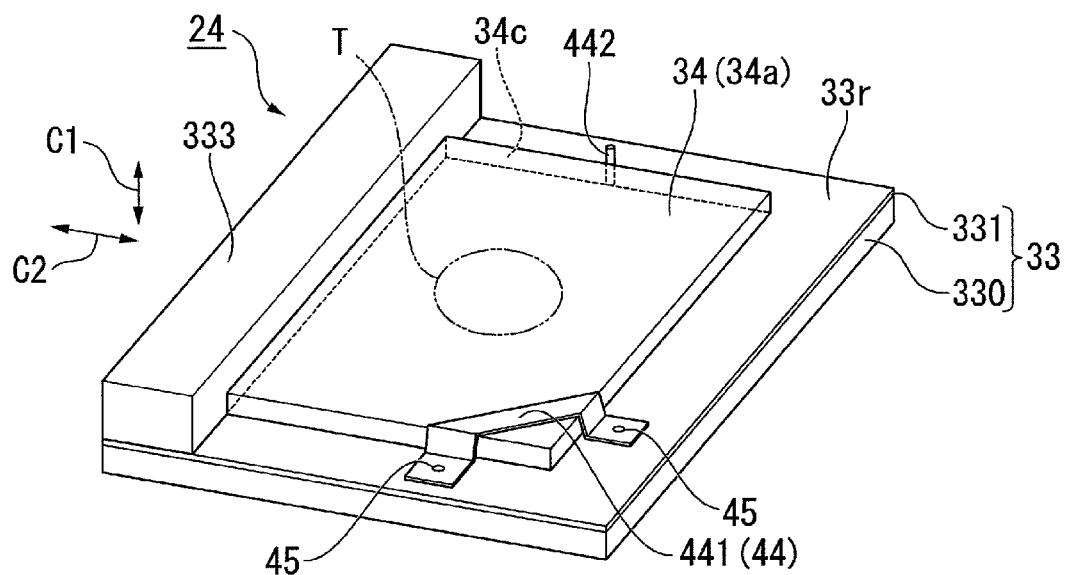
FIG. 23 is a perspective view of a wavelength conversion element according to Variation 2 of the tenth embodiment.

In FIG. 23, components common to those in FIG. 21 have the same reference characters and will not be described.

As shown in FIG. 23, in a wavelength conversion element 24 according to Variation 2, the wall section 333 is provided along one of the two sides of the substrate 33 that are connected to the corner diagonally facing the corner where the first holder 441 is provided in the plan view of the substrate 33, and a pin 442 is provided in correspondence with the other one of the two sides. The wall section 333 and the pin 442 thus restrict the movement of the wavelength converter 34 in the direction along the first surface of the substrate 33. That is, the second holders may be formed of the wall section 333 and the pin 442.

Eleventh Embodiment

An eleventh embodiment of the present disclosure will be described below with reference to FIG. 24.

The configurations of a projector and an illuminator according to the eleventh embodiment are the same as those in the eighth embodiment, and the eleventh embodiment differs from the eighth embodiment in terms of the configuration of the wavelength conversion element. The entire projector and illuminator will therefore not be described.

Figure 24:
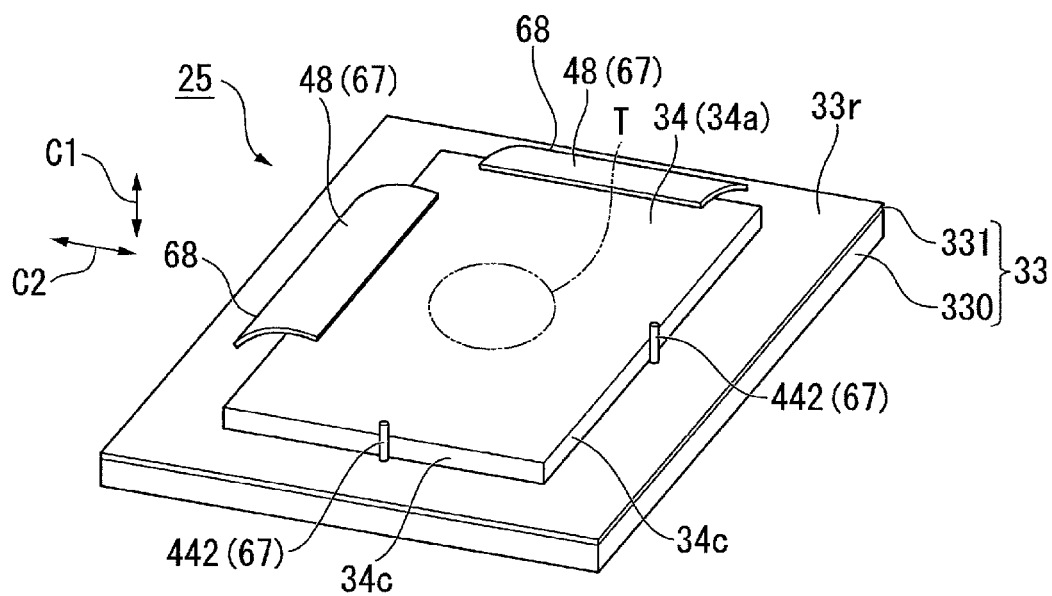
FIG. 24 is a perspective view of a wavelength conversion element according to an eleventh embodiment.

FIG. 24 is a perspective view of the wavelength conversion element according to the eleventh embodiment.

In FIG. 24, components common to those in FIG. 19 in the eighth embodiment have the same reference characters and will not be described.

A wavelength conversion element 25 according to the present embodiment includes the substrate 33, the wavelength converter 34, a holder 67, and fixers 68. The holder 67 includes the first holders 48 and the second holders 442.

The first holders 48 press the wavelength converter 34 against the substrate 33 in the direction C1, in which the excitation light E is incident. The first holders 48 are each formed, for example, of an elastically deformable plate spring member made of stainless steel. The plate spring member has the shape of an annularly curved cylinder part of which is cut. The first holders 48 are provided along two side adjacent to each other out of the four sides of the wavelength converter 34.

The second holders 442 are each formed of a pin provided on the first surface of the substrate 33. The second holders 442 are provided in correspondence with two sides out of the four sides of the wavelength converter 34 excluding the two sides where the first holders 48 are provided. The second holders 442 may be in contact with the third surface 34c of the wavelength converter 34 or may be separate from the third surface 34c. The plurality of second holders 442 thus restrict the movement of the wavelength converter 34 in the direction along the first surface of the substrate 33.

As described above, the holder 67 is so provided as to face the first surface 34a or the third surface 34c of the wavelength converter 34 and hold the wavelength converter 34 in the direction C1, in which the excitation light E is incident, and in the direction C2, which intersects the light incident direction. The light incident area T, on which the excitation light E is incident, is provided in an area of the first surface 34a of the wavelength converter 34 that is an area that is close to the center of the first surface 34a and that does not overlap with the holder 67.

The fixers 68 fix the first holders 48 and the second holders 442 to the substrate 33. The fixers 68 that fix the first holders 48 may each be formed of a pin, a bolt, or any other member, and the fixers 68 that fix the first holders 48 and the second holders 442 may be formed of an adhesive.

The present embodiment also provides the same effects as those provided by the eighth embodiment, for example, the reliability and the light emission efficiency of the wavelength conversion element 25 can be increased.

The wavelength conversion element 25 according to the eleventh embodiment may have the following configurations.

Variation 1

Figure 25:
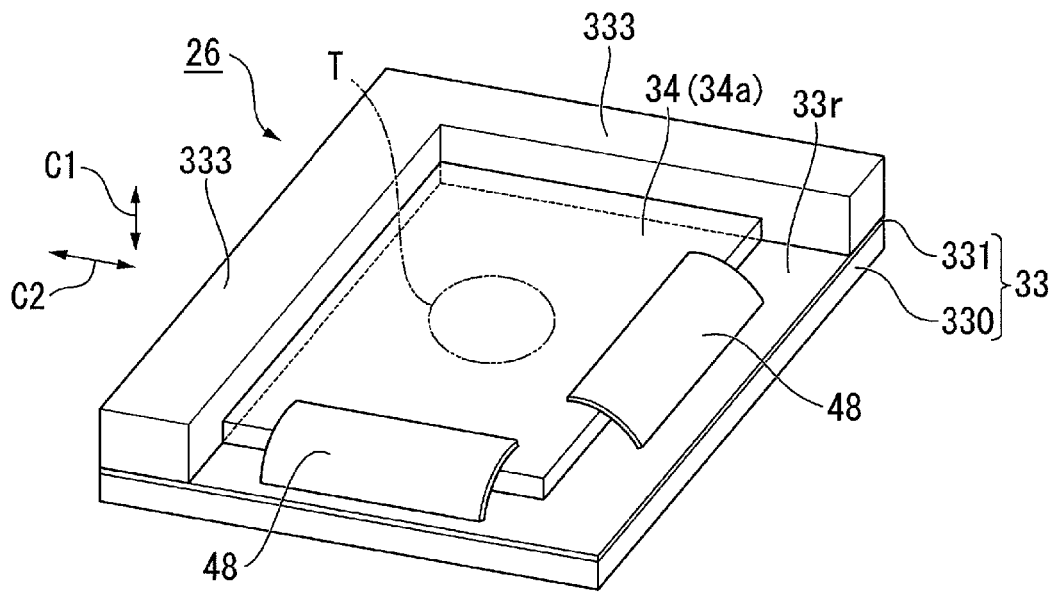
FIG. 25 is a perspective view of a wavelength conversion element according to Variation 1 of the eleventh embodiment.

FIG. 25 is a perspective view of a wavelength conversion element according to Variation 1 of the eleventh embodiment.

In FIG. 25, components common to those in FIG. 24 have the same reference characters and will not be described.

In a wavelength conversion element 26 according to Variation 1, the wall sections 333, which protrude with respect to the other flat portions, are provided along two sides out of the four sides of the substrate 33 excluding the two sides where the first holders 48 are provided, as shown in FIG. 25. The wall sections 333 may be in contact with the third surface 34c of the wavelength converter 34 or may be separate from the third surface 34c. The wall sections 333 thus restrict the movement of the wavelength converter 34 in the direction along the first surface of the substrate 33. That is, the second holders are formed of the wall sections 333.

Variation 2

Figure 26:
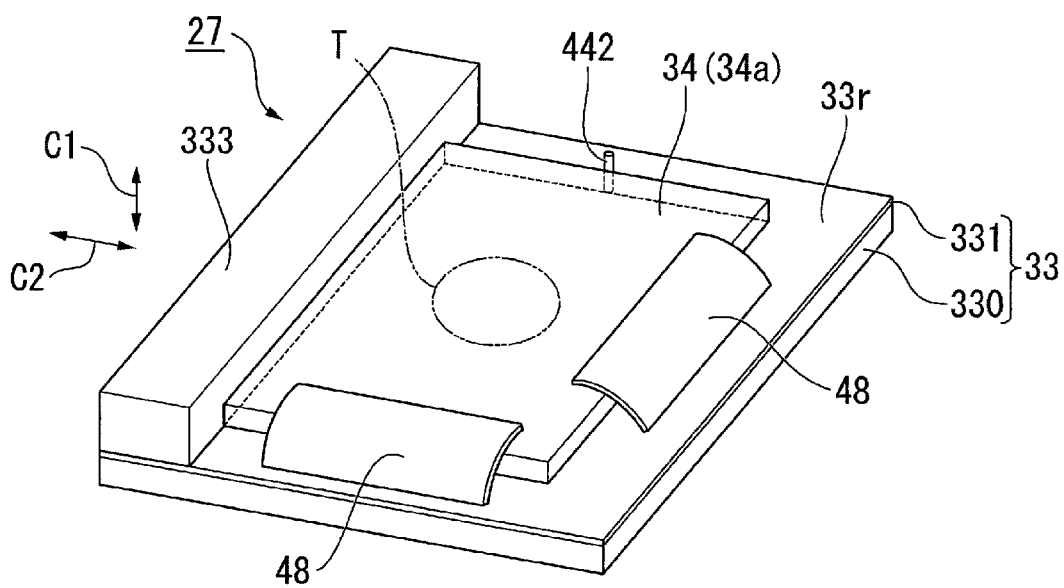
FIG. 26 is a perspective view of a wavelength conversion element according to Variation 2 of the eleventh embodiment.

FIG. 26 is a perspective view of a wavelength conversion element according to Variation 2 of the eleventh embodiment.

In FIG. 26, components common to those in FIG. 24 have the same reference characters and will not be described.

In a wavelength conversion element 27 according to Variation 2, the wall section 333 is provided along one of the two sides excluding the side where the first holder 48 is provided in the plan view of the substrate 33, and the pin 442 is provided in correspondence with the other one of the two sides, as shown in FIG. 26. The wall section 333 and the pin 442 restrict the movement of the wavelength converter 34 in the direction along the first surface of the substrate 33. That is, the second holders are formed of the wall section 333 and the pin 442.

The wavelength conversion elements according to the embodiments described above may have the following configurations.

The wavelength conversion elements shown below are variations in terms of the wavelength converter and the substrate, and the holders and fixers in the embodiments described above can be used. The holders and fixers are therefore omitted in FIGS. 27 to 29 below.

Variation 1

Figure 27:
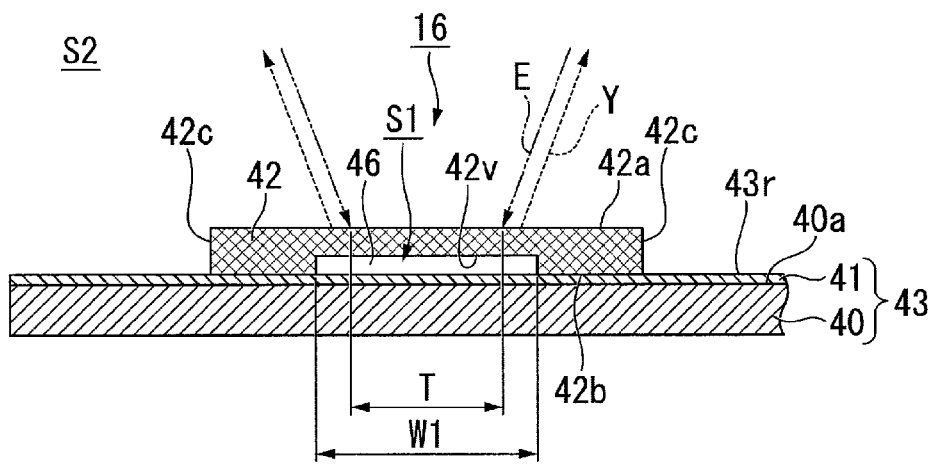
FIG. 27 is a cross-sectional view of a wavelength conversion element according to Variation 1.

FIG. 27 is a cross-sectional view of a wavelength conversion element 16 according to Variation 1.

In FIG. 27, components common to those in FIG. 4 in the first embodiment have the same reference characters and will not be described.

In the wavelength conversion element 16 according to Variation 1, a wavelength converter 42 has a first surface 42a, a second surface 42b, and a third surface 42c. A second recess 42v is provided in the second surface 42b of the wavelength converter 42. The second recess 42v is provided substantially at the widthwise center of the wavelength converter 42. The second recess 42v has an annular shape when viewed in the direction in which the excitation light E is incident. A dimension W1 of the second recess 42v in the width direction of the wavelength converter 42 is greater than the dimension of the light incident area T, on which the excitation light E is incident.

Air is present in a space S1 surrounded by the second recess 42v provided in the wavelength converter 42 and the reflection surface 43r of the substrate 43, and an air layer 46 containing the air is formed. Out of the first surface 42a of the wavelength converter 42, at least part of the portion facing the reflection surface 43r and the air layer 46 is the light incident area T, on which the excitation light E is incident. Although not shown, a communication hole 39, via which the space S1 communicates with an outer space S2, is provided in part of the wavelength converter 42 or the substrate 43.

Variation 2

Figure 28:
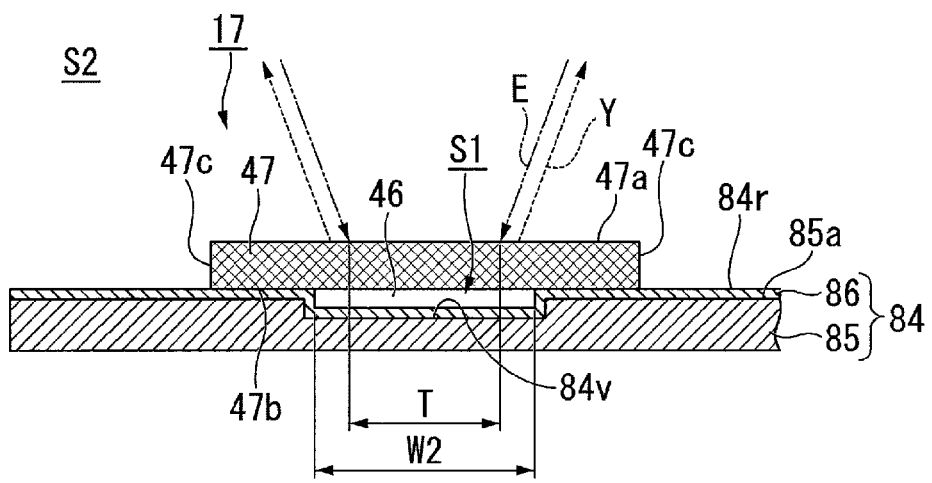
FIG. 28 is a cross-sectional view of a wavelength conversion element according to Variation 2.

FIG. 28 is a cross-sectional view of a wavelength conversion element 17 according to Variation 2.

In FIG. 28, components common to those in FIG. 4 in the first embodiment have the same reference characters and will not be described.

In the wavelength conversion element 17 according to Variation 2, a substrate 84 includes a substrate body 85 and a reflection layer 86. A first recess 84v is provided in the substrate 84. In detail, the first recess 84v is provided in a first surface 85a of the substrate body 85, and the reflection layer 86 is provided on the entire surface of the substrate body 85 including the bottom surface and the side surface of the first recess 84v. The first recess 84v is provided substantially at the widthwise center of the wavelength converter 47. A dimension W2 of the first recess 84v is greater than the dimension of the light incident area T, on which the excitation light E is incident.

Air is present in the space S1 surrounded by the first recess 84v provided in the substrate 84 and the second surface 47b of the wavelength converter 47, and the air layer 46 containing the air is formed. In the present embodiment, the reflection layer 86 is provided on the entire surface of the substrate body 85 including the bottom surface and the side surface of the first recess 84v. The reflection layer 86 is, however, not necessarily provided on the entire surface of the substrate body 85. For example, the reflection layer 86 may be provided, for example, only on the bottom surface of the first recess 84v. Out of the first surface 47a of the wavelength converter 47, at least part of the portion facing a reflection surface 84r and the air layer 46 is the light incident area T, on which the excitation light E is incident. Although not shown, the communication hole 39, via which the space S1 communicates with an outer space S2, is provided in part of the wavelength converter 47 or the substrate 84.

Variation 3

Figure 29:
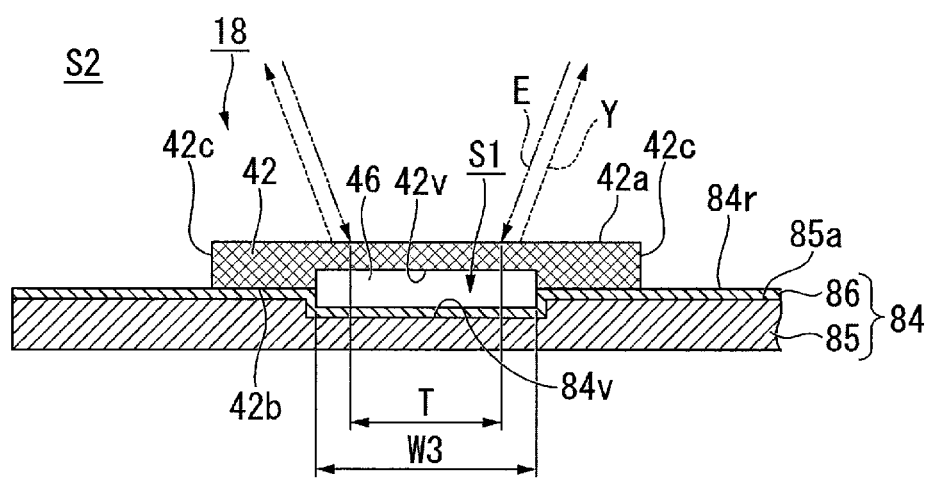
FIG. 29 is a cross-sectional view of a wavelength conversion element according to Variation 3.

FIG. 29 is a cross-sectional view of a wavelength conversion element 18 according to Variation 3.

In FIG. 29, components common to those in FIG. 4 in the first embodiment and FIGS. 27 and 28 have the same reference characters and will not be described.

In the wavelength conversion element 18 according to Variation 3, the substrate 84 includes the substrate body 85 and the reflection layer 86. The first recess 84v is provided in the substrate 84. The second recess 42v is provided in the second surface 42b of the wavelength converter 42. The first recess 84v and the second recess 42v are provided in substantially the same widthwise position in the wavelength converter 42. Dimensions W3 of the first recess 84v and the second recess 42v in the widthwise direction of the wavelength converter 42 are substantially equal to each other and are greater than the diameter of the light incident area T, on which the excitation light E is incident.

Air is present in the space S1 surrounded by the first recess 84v provided in the substrate 84 and the second recess 42v provided in the wavelength converter 42, and the air layer 46 containing the air is formed. In the present embodiment, the reflection layer 86 is provided on the entire surface of the substrate body 85 including the bottom surface and the side surface of the first recess 84v. The reflection layer 86 is, however, not necessarily provided on the entire surface of the substrate body 85. For example, the reflection layer 86 may be provided, for example, only on the bottom surface of the first recess 84v. Although not shown, the communication hole 39, via which the space S1 communicates with the outer space S2, is provided in part of the wavelength converter 47 or the substrate 84.

Variations 1 to 3 described above also provide the same effects as those provided by the embodiments described above, for example, the reliability and the light emission efficiency of the wavelength conversion elements can be increased.

In Variations 1 to 3, in particular, the air layers 38 and 46 are provided below the light incident area T, on which the excitation light E is incident and which corresponds to the light emission areas of the wavelength converters 42 and 47, whereby the critical angles at the second surfaces 42b and 47b of the wavelength converters 42 and 47 can be reduced, as compared with a wavelength conversion element of related art in which no air layer is provided. Therefore, the amount of fluorescence Y incident on the reflection layers 41 and 86 can be reduced, so that the loss of the fluorescence Y at the reflection layers 41 and 86 can be reduced, whereby the light emission efficiency can be increased.

Further, in the wavelength conversion elements 16, 17, and 18 according to Variations 1 to 3, the air layers 38 and 46 interposed between the wavelength converters 42, 47 and the substrates 43, 84 each have a small thickness of several micrometers, so that even air having low thermal conductivity does not contribute to a large increase in thermal resistance. Moreover, in the area other than the area where the first recess 84v or the second recess 42v is provided, the second surfaces 42b and 47b of the wavelength converters 42 and 47 are in contact with the reflection surfaces 43r and 84r of the substrates 43 and 84, whereby heat in the wavelength converters 42 and 47 is sufficiently conducted to the substrates 43 and 84. In the wavelength conversion elements 16, 17, and 18 according to Variations 1 to 3, the factors described above suppress an increase in the temperatures of the wavelength converters 42 and 47, whereby high light emission efficiency can be maintained.

The technical range of the present disclosure is not necessarily limited to the embodiments described above, and a variety of changes can be made thereto to the extent that the changes do not depart from the substance of the present disclosure.

For example, in the wavelength conversion element according to each of the embodiments described above, a dielectric multilayer film may be provided on the second surface of the wavelength converter, which is the surface facing the reflection surface of the substrate. In this case, the dielectric multilayer film is formed, for example, of a laminate of an $SiO_2$ film and a $TiO_2$ film alternately layered on each other multiple times. That is, the dielectric multilayer film has a configuration in which two types of dielectric film having refractive indices different from each other are alternately layered on each other multiple times. The number of dielectric films that form the dielectric multilayer film and the thickness of each of the dielectric films are not limited to specific values.

When dielectric multilayer film is provided on the second surface of the wavelength conversion layer, the amount of fluorescence reflected off the second surface out of the fluorescence incident on the second surface of the wavelength converter at angles of incidence smaller than or equal to the critical angle can be increased by the dielectric multilayer film. The amount of fluorescence that reaches the reflection surface of the substrate can therefore be reduced, whereby optical loss at the reflection surface can be suppressed. As a result, the light emission efficiency of the wavelength conversion element can be increased.

In the embodiments described above, an air layer is provided between the wavelength converter and the substrate by using minute irregularities and warpage of the wavelength converter or the substrate, and the air layer may be provided by using another approach. As an approach of this type, for example, a spacer for holding a gap between the wavelength converter and the substrate may be interposed between the second surface of the wavelength converter and the reflection surface of the substrate. Instead, a recess may be provided in at least one of the second surface of the wavelength converter and the reflection surface of the substrate.

In addition to the above, specific descriptions of the shape, the number, the arrangement, the material, and other factors of the components of the wavelength conversion element, the illuminator, and the projector are not limited to those in the embodiments described above and can be changed as appropriate. The above embodiments have been described with reference to the case where the illuminator according to each of the embodiments of the present disclosure is incorporated in a projector using liquid crystal light valves, but not necessarily. The illuminator may be incorporated in a projector using a digital micromirror device as each of the light modulators.

In the embodiments described above, the case where the illuminator according to each of the embodiments of the present disclosure is incorporated in a projector is presented by way of example, but not necessarily. The illuminator according to each of the embodiments of the present disclosure may be used, for example, as a lighting apparatus and a headlight of an automobile.

What is claimed is:

1. A wavelength conversion element comprising:
   a substrate having a reflection surface;
   a wavelength converter that has a first surface on which excitation light that belongs to a first wavelength band is incident, a second surface located at a side opposite the first surface, and a third surface that intersects the first or second surface, the wavelength converter converting the excitation light in terms of wavelength into fluorescence that belongs to a second wavelength band different from the first wavelength band; and a plate spring member that is so provided as to face the first or third surface and holds the wavelength converter in a direction along a direction in which the excitation light is incident and in a direction that intersects the light incident direction, wherein the plate spring member is fixed to the substrate, the wavelength converter has an annular shape having a circular opening when viewed in the direction along the light incident direction, the plate spring member includes an elastically deformable member, and the elastically deformable member has a portion that overlaps with an area of the substrate that is an area outside the wavelength converter when viewed in the direction along the light incident direction and another portion that overlaps with an outer edge portion of the wavelength converter when viewed in the direction along the light incident direction, and the elastically deformable member is fixed to the substrate in a portion outside the wavelength converter and presses the outer edge portion of the wavelength converter.

2. An illuminator comprising:

the wavelength conversion element according to claim 1; and a light source that outputs the excitation light toward the wavelength conversion element.

3. The illuminator according to claim 2, wherein the wavelength conversion element is rotatable around a rotational shaft, and the illuminator further comprising a rotator that rotates the wavelength conversion element around the rotational shaft.

4. A projector comprising:

the illuminator according to claim 3;

a light modulator that modulates light from the illuminator in accordance with image information; and a projection optical apparatus that projects the light modulated by the light modulator.

5. A projector comprising:

the illuminator according to claim 2;

a light modulator that modulates light from the illuminator in accordance with image information; and a projection optical apparatus that projects the light modulated by the light modulator.

* * * * *